United States Patent
Moribe et al.

(10) Patent No.: US 9,238,741 B2
(45) Date of Patent: Jan. 19, 2016

(54) AQUEOUS INK, INK CARTRIDGE, AND INK JET RECORDING METHOD

(71) Applicant: CANON KABUSHIKI KAISHA, Tokyo (JP)

(72) Inventors: Kenji Moribe, Fujisawa (JP); Arihiro Saito, Saitama (JP); Yuki Nishino, Kawasaki (JP); Kuniaki Fujimoto, Chofu (JP); Satoshi Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 14/236,313

(22) PCT Filed: May 7, 2013

(86) PCT No.: PCT/JP2013/002935
§ 371 (c)(1),
(2) Date: Jan. 30, 2014

(87) PCT Pub. No.: WO2013/168409
PCT Pub. Date: Nov. 14, 2013

(65) Prior Publication Data
US 2014/0168314 A1    Jun. 19, 2014

(30) Foreign Application Priority Data

May 9, 2012   (JP) .................. 2012-107453
Apr. 23, 2013  (JP) .................. 2013-090481

(51) Int. Cl.
C09D 11/00     (2014.01)
C09D 11/322    (2014.01)
B41J 2/21      (2006.01)
B41J 2/175     (2006.01)
C09D 11/32     (2014.01)

(52) U.S. Cl.
CPC ........... *C09D 11/322* (2013.01); *B41J 2/17503* (2013.01); *B41J 2/2107* (2013.01); *C09D 11/32* (2013.01)

(58) Field of Classification Search
CPC .... B41J 2/2107; B41J 2/17503; C09D 11/30; C09D 11/32; C09D 11/322; C09D 11/326
USPC ................. 347/86, 95–100; 106/31.13, 31.6
See application file for complete search history.

(56) References Cited

U.S. PATENT DOCUMENTS

| | | | |
|---|---|---|---|
| 2007/0100023 A1* | 5/2007 | Burns | B82Y 30/00 523/160 |
| 2007/0100024 A1* | 5/2007 | Gu | B82Y 30/00 523/160 |
| 2012/0033012 A1 | 2/2012 | Nagai | |
| 2012/0268518 A1* | 10/2012 | Saito | C09D 11/322 347/20 |

FOREIGN PATENT DOCUMENTS

| | | |
|---|---|---|
| CN | 101379143 A | 3/2009 |
| EP | 1061107 A1 | 12/2000 |
| JP | 2000198955 A | 7/2000 |
| JP | 2002080763 A | 3/2002 |
| JP | 2009515007 A | 4/2009 |
| JP | 2012052097 A | 3/2012 |
| WO | 2007/053564 A2 | 5/2007 |
| WO | 2007053564 A2 | 5/2007 |

\* cited by examiner

*Primary Examiner* — Matthew Luu
*Assistant Examiner* — Rut Patel
(74) *Attorney, Agent, or Firm* — Canon U.S.A. Inc., IP Division

(57) ABSTRACT

An aqueous ink for ink jet contains a self-dispersible pigment in which a first functional group including a phosphonic acid group and a second functional group including at least one of a carboxylic acid group and a sulfonic acid group are bonded to a particle surface, wherein a surface charge amount derived from the phosphonic acid group included in the above-described first functional group is 0.3 micromoles/m$^2$ or more, a total surface charge amount derived from the carboxylic acid group and the sulfonic acid group included in the above-described second functional group is 1.0 micromoles/m$^2$ or more, and a total surface charge amount derived from anionic groups included in the above-described first functional group and the above-described second functional group is 2.0 micromoles/m$^2$ or more and 8.0 micromoles/m$^2$ or less.

25 Claims, No Drawings

AQUEOUS INK, INK CARTRIDGE, AND INK JET RECORDING METHOD

TECHNICAL FIELD

The present invention relates to an ink jet aqueous ink, an ink cartridge including the above-described aqueous ink, and an ink jet recording method.

BACKGROUND ART

It is possible to record on various recording medium by the ink jet recording method.

In order to record better images, various inks, for example, an ink suitable for recording images with the image quality of a photograph on glossy paper or the like and an ink suitable for recording documents on plain paper or the like, in accordance with the purposes have been proposed. In recent years, the ink jet recording method has been utilized for printing a business document including characters and charts, where plain paper or the like is used as a recording medium. The frequency of utilization for such an application has increased significantly. In such an application, a further enhancement in color developability of an image is required. In addition, the recording speed is important and, therefore, an improvement in ejection characteristics of an ink is required than ever.

In response to the above-described requirements, there are proposals taking note of the types of functional groups which are bonded to self-dispersible pigments (refer to PTL 1 and PTL 2). PTL 1 describes an ink containing a self-dispersible pigment, in which a functional group, e.g., a carboxylic acid group, is bonded to a particle surface, and a salt, and it is stated that the color developability of an image is enhanced as the density of the functional group on the particle surface becomes high. PTL 2 describes an ink containing a self-dispersible pigment in which a functional group having high reactivity with calcium is bonded to the surface of a pigment particle. PTL 2 further describes an ink containing a self-dispersible pigment with a phosphonic acid group and a self-dispersible pigment with another functional group, and an ink containing a self-dispersible pigment with a functional group including both the phosphonic acid group and the carboxylic acid group.

CITATION LIST

Patent Literature

PTL 1: Japanese Patent Laid-Open No. 2002-080763
PTL 2: PCT Japanese Translation Patent Publication No. 2009-515007

SUMMARY OF INVENTION

Technical Problem

Various studies have been made previously to enhance the color developability of recorded images. As for the ink described in PTL 1, the color developability can be further enhanced by containing the salt in the ink to a large extent, although the color developability of an image of a recording medium having high permeability is still insufficient. If the salt is contained in the ink to a large extent in order to enhance the color developability, a salting-out effect is exerted pronouncedly, so that the particle diameter of the pigment increases significantly and a problem may occur in ejection of the ink.

Meanwhile, as described in PTL 2, the color developability of a recorded image can be enhanced to some extent by using the self-dispersible pigment, in which the functional group, e.g., a phosphonic acid group is bonded and which has high reactivity with calcium, as a coloring material. However, according to the studies of the present inventors, it was found that the ink containing such a self-dispersible pigment exhibited insufficient intermittent ejection stability. Specifically, it was ascertained that the ink was not ejected in some cases where an ink was ejected again after an ejection orifice to eject the ink was left opened for a certain period, such as, several seconds to several ten seconds. In addition, it was found that this issue occurred considerably in the case where water in the ink was evaporated easily as compared with water evaporation in an environment of an ambient temperature and a normal humidity (temperature of about 25 degrees Celsius, relative humidity of about 50%), that is, in an environment of a high temperature and a low humidity (temperature of about 30 degrees Celsius, relative humidity of about 15%). Such a phenomenon occurs because of evaporation of water and the like in the ink from some ejection orifice when a state, in which the ink is not ejected from the ejection orifice, continues for a certain period during scanning of a recording head in recording of an image by the ink jet recording method. Hereafter a characteristic of the ink related to such a phenomenon is referred to as intermittent ejection stability, and excellent intermittent ejection stability referred to that an ink ejection problem does not occur easily even when the above-described situation occurs.

Likewise, the ink containing the self-dispersible pigment with the phosphonic acid group and the self-dispersible pigment with another functional group exhibited insufficient intermittent ejection stability. On the other hand, the ink containing the self-dispersible pigment with the functional group including both the phosphonic acid group and the carboxylic acid group exhibited relatively high intermittent ejection stability as compared with the ink containing the self-dispersible pigment with the functional group including only the phosphonic acid group. However, the color developability at the level required in recent years was not obtained.

The present invention provides an aqueous ink exhibiting excellent intermittent ejection stability and being capable of obtaining an image having high color developability and an ink cartridge and an ink jet recording method by using the above-described aqueous ink

Solution to Problem

An aqueous ink for ink jet according to an aspect of the present invention contains a self-dispersible pigment in which a first functional group including a phosphonic acid group and a second functional group including at least one of a carboxylic acid group and a sulfonic acid group are bonded to a particle surface, wherein a surface charge amount derived from the phosphonic acid group included in the above-described first functional group is 0.3 micromoles/m$^2$ or more, a total surface charge amount derived from the carboxylic acid group and the sulfonic acid group included in the above-described second functional group is 1.0 micromoles/m$^2$ or more, and a total surface charge amount derived from anionic groups included in the above-described first functional group and the above-described second functional group is 2.0 micromoles/m 2 or more and 8.0 micromoles/m$^2$ or less.

Advantageous Effects of Invention

According to aspects of the present invention, an aqueous ink exhibiting excellent intermittent ejection stability and being capable of obtaining an image having high color developability and an ink cartridge and an ink jet recording method by using the above-described aqueous ink are provided.

DESCRIPTION OF EMBODIMENTS

Aspects of the present invention will be described below in detail with reference to the embodiments according to the present invention. Hereafter an ink jet aqueous ink may be simply referred to as an ink and a self-dispersible pigment may be simply referred to as a pigment.

First Embodiment

A main embodiment according to the present invention will be described. As described above, in the case where the phosphonic acid group was selected as an anionic group included in a functional group which is bonded to a self-dispersible pigment to enhance the color developability of an image recorded on a recording medium, e.g., plain paper, it was found that the intermittent ejection stability was degraded. In comparison with this, the self-dispersible pigment in which the anionic group is not the phosphonic acid group, but the carboxylic acid group or the sulfonic acid group exhibited relatively high intermittent ejection stability of the ink. However, in the case where the latter self-dispersible pigment was used, under the usual condition, if the salt content was specified in such a way as to keep the particle diameter at the level which did not cause a problem in ejection of an ink, the color developability at the level required in recent years was not obtained.

It was previously ascertained that when the color developability of images recorded by the ink containing the self-dispersible pigment were enhanced, the intermittent ejection stability of the ink was degraded. The present inventors also understood that there was a relationship of tradeoff between the two performances. However, as a result of detailed studies by the present inventors, a technique to control the respective performances independently was found. The details are as described below.

The intermittent ejection stability of the ink is a performance related to whether the ink is ejected again stably after an ejection orifice to eject the ink is left opened for a certain period, such as, several seconds to several ten seconds, and is a phenomenon in close relation to evaporation of water and the like from the ink. The intermittent ejection stability of the ink is different depending on the type of the anionic group included in the functional group which is bonded to the self-dispersible pigment. Therefore, the present inventors noted the relationship between the self-dispersible pigment and water molecules.

It is confirmed that an interaction between the self-dispersible pigment and water molecules considerably relates to the type and the introduced amount of functional group present on the particle surface of the self-dispersible pigment. In particular, in the case where the anionic group is included in the functional group, a hydrogen bond is formed between this anionic group and a hydrogen atom of a water molecule positively charged because of polarization. Consequently, the anionic group has hydrated water and, thereby, the hydrophilicity of the self-dispersible pigment is enhanced. That is, it is believed to be possible to enhance the hydrophilicity of the self-dispersible pigment by increasing the introduced amount of functional group including the anionic group.

On the basis of the above-described idea, the present inventors noted the introduced amount of anionic group included in the functional group which is bonded to the self-dispersible pigment and studied on the intermittent ejection stability of the ink. As a result, it was found that the ink containing the self-dispersible pigment with the functional group including the phosphonic acid group exhibited insufficient intermittent ejection stability because the introduced amount of the phosphonic acid group was small. The present inventors evaluated an ink containing a self-dispersible pigment with an increased introduced amount of the functional group including the phosphonic acid group and were able to enhance the intermittent ejection stability of the ink to some extent following the above-described idea. Consequently, it was indicated that the hydrophilicity of the self-dispersible pigment was able to be enhanced by increasing the introduced amount of the functional group including even the phosphonic acid group. However, the level of the intermittent ejection stability was not yet acceptable. In particular, the intermittent ejection stability in an environment at a high temperature and a low humidity (temperature of about 30 degrees Celsius and relative humidity of about 15%) was insufficient. Meanwhile, the color developability was not enhanced even when the introduced amount of the functional group including the phosphonic acid group increased.

The above-described facts are summarized. In the case where the phosphonic acid group was selected as the anionic group included in the functional group which is bonded to the self-dispersible pigment, tendencies were as described below. If the introduced amount of the functional group including the phosphonic acid group increased, the intermittent ejection stability of the ink was improved to some extent, although the level was not yet acceptable. In particular, the intermittent ejection stability was insufficient in an environment at a high temperature and a low humidity. The color developability of the image was not changed.

On the other hand, in the case where the anionic group included in the functional group which is bonded to the self-dispersible pigment was the carboxylic acid group or the sulfonic acid group, the above-described tendencies were not observed. When the introduced amount of the functional groups including these anionic groups increased, the intermittent ejection stability of the ink was improved and, furthermore, the color developability of the image was enhanced to some extent. That is, in the case where the carboxylic acid group or the sulfonic acid group was selected as the anionic group included in the functional group which is bonded to the self-dispersible pigment, the resulting tendency indicated that the higher introduced amount of the functional group including the anionic group was the better. However, even when the introduced amount of the functional group including the carboxylic acid group or the sulfonic acid group into the self-dispersible pigment was maximized, the color developability at the level required in recent years was not obtained.

It is estimated that the intermittent ejection stability is different depending on the solubility of the anionic group into water. That is, a salt of carboxylic acid and a salt of sulfonic acid have relatively high solubility in water, whereas a salt of phosphonic acid has relatively low solubility in water. Consequently, when evaporation of water and the like in the ink proceeds, the self-dispersible pigment having the carboxylic acid group or the sulfonic acid group can keep the dispersion state stably. On the other hand, as for the phosphonic acid group, the dispersion state of the self-dispersible pigment becomes unstable easily, so that the viscosity of the ink increases because of aggregation of the pigment and the particle diameter of the pigment increases.

The present inventors considered that it was necessary to allow the functional group bonded to the particle surface of the self-dispersible pigment to have the phosphonic acid group in order to obtain the color developability satisfying the level required in recent years and studied on the technique to enhance the intermittent ejection stability of the ink. As a result, it was found that use of the self-dispersible pigment, in which a second functional group including at least one of a carboxylic acid group and a sulfonic acid group was introduced on the surface of the pigment in addition to a first functional group including the phosphonic acid group, as a coloring material of the ink was effective. Furthermore, it was found that the compatibility between the color developability of an image and the intermittent ejection stability of the ink was able to be ensured at a high level by specifying the introduced amount of the anionic groups included in the respective functional groups to be predetermined values. The details will be described below.

In order to realize an enhancement in color developability of an image, it is effective to use the self-dispersible pigment including the functional group including the phosphonic acid group and adjust the introduced amount of the above-described functional group to a predetermined value or more. It is estimated that this is on the basis of the following mechanism. The phosphonic acid group has a specific property of being able to form a chelate structure from two phosphonic acid groups and one cation (loading material, e.g., calcium, contained in a recording medium). Consequently, it becomes possible to form a cross-linking structure between pigment particles with the phosphonic acid group and the cation therebetween by introducing a predetermined amount or more of functional group including the phosphonic acid group on the surface of the pigment particle. It is confirmed that after the ink is applied to a recording medium, the pigment particles are thereby aggregated efficiently, and an image having high color developability is obtained.

As described above, in order to enhance the intermittent ejection stability of the ink, an increase in the introduced amount of functional group including the phosphonic acid group was effective. However, in particular, the intermittent ejection stability is not obtained in an environment at a high temperature and a low humidity by only the functional group including the phosphonic acid group. Therefore, it is necessary to ensure the introduced amount of the first functional group including the phosphonic acid group required for enhancing the color developability of an image and, in addition, introduce separately a predetermined amount or more of second functional group including at least one of a carboxylic acid group and a sulfonic acid group. In this manner, the self-dispersible pigment with an increased introduced amount of the functional group including the anionic group because of the first functional group and the second functional group was used, so that the image having high color developability was able to be recorded and the ink exhibiting excellent intermittent ejection stability was able to be obtained.

The mechanism of an improvement in the intermittent ejection stability due to an increase in the introduced amount of the functional group including the anionic group is considered. When the introduced amount of the functional group including the anionic group increases, the anionic group capable of forming a hydrogen bond with a water molecule increases correspondingly, so that the hydrophilicity of the self-dispersible pigment is improved. In the case of an ink containing the self-dispersible pigment with a high introduced amount of the functional group including the anionic group, as described above, if water and the like in the ink are evaporated from an ejection orifice, the concentration of water in the ink in the vicinity of the ejection orifice is reduced locally. Consequently, the self-dispersible pigment moves in the direction of high water concentration, in which a more stable dispersion state thereof is maintained easily because of conformability with water, that is, in the direction with decreasing proximity to the ejection orifice in an ink flow path of a recording head. As a result, it is estimated that the concentration of the pigment in the ink in the vicinity of the ejection orifice is relatively reduced and, thereby, an increase in viscosity of the ink due to evaporation of water and the like is suppressed, so as to improve the intermittent ejection stability of the ink.

Then, the mechanism of an improvement in the intermittent ejection stability, in particular, in an environment at a high temperature and a low humidity due to introduction of a predetermined amount or more of carboxylic acid group and sulfonic acid group included in the second functional group in addition to the first functional group is considered. As described above, in the case where only the first functional group is bonded to the self-dispersible pigment, when evaporation of water and the like in the ink proceeds, the phosphonic acid group causes an unstable dispersion state of the self-dispersible pigment easily, the viscosity of the ink is increased by aggregation of the pigment, and the particle diameter of the pigment increases. If such a phenomenon occurs, movement of the self-dispersible pigment in the direction with decreasing proximity to the ejection orifice in the ink flow path of the recording head becomes difficult, further increase in the viscosity of the ink is not suppressed, so that the intermittent ejection stability of the ink is degraded. On the other hand, it is estimated that when a predetermined amount or more of second functional group is present together, even when water is evaporated, the dispersion state of the self-dispersible pigment is maintained stably by the presence of the carboxylic acid group or the sulfonic acid group, so as to improve the intermittent ejection stability of the ink.

As is understood from these mechanisms, the ink which is described in PTL 2 and which contains the self-dispersible pigment with the functional group including the phosphonic acid group and the self-dispersible pigment with another functional group exhibits insufficient intermittent ejection stability of the ink. This is because even when the self-dispersible pigment with another functional group is present in the ink, the hydrophilicity of the self-dispersible pigment with the functional group including the phosphonic acid group is not enhanced.

The mechanism of obtainment of an image exhibiting high color developability due to the ink by using the self-dispersible pigment with both the first functional group including the phosphonic acid group and the second functional group including at least one of the carboxylic acid group and the sulfonic acid group is considered. As described above, it is confirmed that high color developability of an image due to introduction of the functional group including the phosphonic acid group is because of aggregation of the pigment on the basis of formation of the cross-linking structure between particles through the phosphonic acid group. Therefore, it is confirmed that degradation in color developability of an image is limitative insofar as the first functional group including the phosphonic acid group is present at an amount more than or equal to the amount required for forming the cross-linking structure. However, if the introduced amount of the first functional group including the phosphonic acid group and the second functional group including the carboxylic acid group or the sulfonic acid group is too large, the total introduced amount of anionic groups becomes too large. In this case, too strong electric repulsion occurs between a plurality of pigment particles, formation of the cross-linking structure through the phosphonic acid group is hindered and, as a result, the color developability of an image is degraded.

The ink which is described in PTL 2 and which contains the self-dispersible pigment with the functional group including both the phosphonic acid group and the carboxylic acid group exhibited intermittent ejection stability at an acceptable level but insufficient color developability of an image. As for such a self-dispersible pigment, it is estimated that the introduced amount of the anionic group is increased by increasing the introduced amount of the functional group, the hydrophilicity of the self-dispersible pigment is enhanced and, in addition, the intermittent ejection stability of the ink is improved because the carboxylic acid group having high solubility in water is present. However, it is confirmed that, in the case of the functional group including both the phosphonic acid group and the carboxylic acid group, the carboxylic acid group is present very close to the phosphonic acid group and, thereby, formation of the cross-linking structure through the phosphonic acid group is hindered by electric repulsion between carboxylic acid groups. As a result, it is confirmed that the color developability of an image is degraded as compared with the self-dispersible pigment with the functional group including the phosphonic acid group and not including the carboxylic acid group.

Consequently, in order to enhance the intermittent ejection stability of the ink, it is necessary that the following two conditions are satisfied. The total amount of anionic groups included in the first functional group and the second functional group of the self-dispersible pigment is required to become a predetermined value or more and, in addition, the amount of at least one of the carboxylic acid group and the sulfonic acid group included in the second functional group is required to become a predetermined amount or more. Meanwhile, in order to obtain an image exhibiting high color developability, it is necessary that the following two conditions are satisfied. The amount of phosphonic acid group included in the first functional group of the self-dispersible pigment is required to become a predetermined amount or more and, in addition, the total amount of anionic groups included in the first functional group and the second functional group of the self-dispersible pigment is required to become a predetermined value or less. Specifically, it is necessary that the surface charge amount derived from the phosphonic acid group included in the first functional group is 0.3 micromoles/$m^2$ or more, the total surface charge amount derived from the carboxylic acid group and the sulfonic acid group included in the second functional group is 1.0 micromoles/$m^2$ or more, and the total surface charge amount derived from anionic groups included in the first functional group and the second functional group is 2.0 micromoles/$m^2$ or more and 8.0 micromoles/$m^2$ or less.

In the present invention, the surface charge amount derived from anionic groups included in the respective functional groups is expressed in the number of moles per unit surface area of a pigment particle. This is because both the formation of the cross-linking structure through the phosphonic acid group and the formation of the hydrogen bond between the anionic group and a water molecule occur on the surface of the pigment particle or in the vicinity thereof and, therefore, the number of moles per unit surface area of a pigment particle becomes dominant to frequency of them.

Second Embodiment

Next, a second embodiment according to the present invention will be described.

As described above, the color developability of a recorded image is enhanced by using the self-dispersible pigment, in which a predetermined amount or more of functional group including the phosphonic acid group is bonded, as a coloring material. However, according to the studies of the present inventors, it was found that when this ink was applied to a method in which the ink was ejected from the recording head by the action of thermal energy and ejection was performed for a long term, irregular ejection occurred and normal ejection was not performed in some cases. The cause of such an issue was studied and it was found that in the case where a free copper ion (described later in detail) was present in an ink, when ejection of the ink was repeated, irregular ejection occurred because of accumulations due to kogation on a heat generation portion (heater) of a recording head. On the other hand, in the case where the anionic group included in the functional group of the self-dispersible pigment was the carboxylic acid group or the sulfonic acid group, even when a free copper ion was present in the ink, degradation in long-term ejection stability was at a low level as compared with the phosphonic acid group and an acceptable level was maintained.

The relationship between the type of the anionic group included in the functional group which is bonded to the self-dispersible pigment and the long-term ejection stability of the ink containing the free copper ion is explained below. In the case where the above-described anionic group is the phosphonic acid group, a cross-linking structure is formed between pigment particles through the phosphonic acid group and a copper ion. Therefore, the phosphonic acid groups to disperse the self-dispersible pigment are reduced and the stability of the dispersion state of the self-dispersible pigment is degraded to some extent as compared with the case of the ink not containing the free copper ion. When this ink is applied to a method (thermal method) in which an ink is ejected from a recording head by the action of thermal energy, hydrated water of the phosphonic acid group is eliminated by the thermal energy applied to the ink during ejection, so that the stability of the dispersion state is further degraded. Consequently, part of the self-dispersible pigment lose the dispersibility and is accumulated on the heater of the recording head because of kogation. If long-term ejection is performed, irregular ejection of the ink occurs because of the accumulation. On the other hand, in the case where the above-described anionic group is the carboxylic acid group or the sulfonic acid group, these anionic groups do not form the cross-linking structure through the copper ion, so that the stability of the dispersion state is not degraded. Therefore, degradation in the long-term ejection stability does not occur regardless of the presence or absence of the free copper ion in the ink.

Meanwhile, it was found that the free copper ion in the ink was captured by a so-called chelating agent, but in the case where the content in the ink was specified to be at a level of suppressing degradation in the long-term ejection stability, the color developability was somewhat degraded in some cases as compared with the case where the chelating agent was not used. The reason for this is confirmed to be that formation of the cross-linking structure between pigment particles through the phosphonic acid group and the cation is hindered because the cation is deprived by the chelating agent.

The present inventors performed studies in order to suppress degradation in the long-term ejection stability in the case where the ink in the above-described first embodiment further contained a free copper ion and was applied to the thermal method. As described above, in the case where the free copper ion is present, the reason for degradation in the long-term ejection stability of the ink containing the self-dispersible pigment with the functional group including the phosphonic acid group is as follows. That is, the cause is degradation in stability of the dispersion state of the self-dispersible pigment on the basis of the formation of the cross-linking structure between pigment particles through the phosphonic acid group and copper ion and elimination of hydrated water from the phosphonic acid group by the thermal energy. Among them, the former formation of the cross-linking structure is the same mechanism as that of obtainment of high color developability, which is one of the effects of the present invention. Therefore, the long-term ejection stability and the color developability are in the relationship of tradeoff (refer to the above-described action of the chelating agent). Consequently, the present inventors considered that the latter suppression of elimination of hydrated water from the phosphonic acid group by the thermal energy was effective.

Specifically, the bonding energy to hydrated water is different depending on the type of the anionic group. Therefore, it is considered that the dispersion state of the self-dispersible pigment is able to be suppressed from becoming unstable on the basis of the thermal energy by specifying the introduced amount of the functional group including the anionic group exhibiting strong bonding energy to hydrated water to be a predetermined amount or more. The present inventors performed studies on the type of the anionic group and the introduced amount of the functional group including the anionic group. As a result, it was found that in addition to the conditions required of the self-dispersible pigment in the above-described first embodiment, inclusion of the sulfonic acid group in the second functional group and satisfaction of the surface charge amount derived from the sulfonic acid group included in the second functional group of 1.0 micromoles/$m^2$ or more were necessary. Such an ink according to the second embodiment is allowed to suppress degradation in the long-term ejection stability even when the free copper ion is contained.

Third Embodiment

Next, a third embodiment according to the present invention will be described.

As described above, the color developability of a recorded image is enhanced by using the self-dispersible pigment, in which a predetermined amount or more of functional group including the phosphonic acid group is bonded, as a coloring material. However, according to the studies of the present inventors, it was found that when this ink was applied to an ink jet recording apparatus, in which synthetic rubber was contained in a material constituting a member to be brought into contact with the ink, deformation or swelling of the synthetic rubber brought into contact with the ink occurred in some cases. The cause of such an issue was studied and it was found that in the case where the free copper ion (described later in detail) was present in an ink as with the second embodiment, this served as a catalyst, a hydrolysis reaction of the synthetic rubber occurred and, thereby, deformation or swelling thereof occurred. This is a phenomenon known as a so-called "copper-induced degradation". As for usual measures, it is effective to minimize the amount of a free copper ion. However, the free copper ion may be mixed as incidental impurities of a material constituting the ink. In particular, in the case of an ink using a pigment having a copper phthalocyanine skeleton as a pigment species, it may be difficult to avoid intrusion thereof. Meanwhile, deformation or swelling of the synthetic rubber is suppressed to some extent by using the chelating agent, although the color developability may be degraded to some extent, as described above.

The present inventors performed studies in order to suppress deformation and swelling of the synthetic rubber in the case where the ink in the above-described first embodiment further contained the free copper ion and was applied to an ink jet recording apparatus including a member formed from a material containing synthetic rubber. As a result, it was found that in addition to the conditions required of the self-dispersible pigment in the above-described first embodiment, satisfaction of the surface charge amount derived from the phosphonic acid group included in the first functional group of 2.0 micromoles/$m^2$ or more was necessary. Such an ink according to the third embodiment is allowed to suppress deformation or swelling of the synthetic rubber included in the ink jet recording apparatus even when the free copper ion is contained.

The mechanism of obtainment of such an effect is estimated as described below. That is, the phosphonic acid group and the free copper ion form a chelate substrate. The chelating force of the phosphonic acid group is weak as compared with that of disodium ethylenediaminetetraacetate for general purpose use as a chelating agent, although the probability of dissolution of copper ions in an aqueous medium is decreased by increasing the introduced amount of the functional group including the phosphonic acid group to a predetermined amount or more. Consequently, it is considered that the state which looks as if no free copper ions are present is approached and, as a result, a hydrolysis reaction of the synthetic rubber, the reaction being facilitated by the free copper ion serving as a catalyst, that is, copper-induced degradation, is suppressed.

Aqueous Ink

Each of components constituting the aqueous ink according to aspects of the present invention and properties of the ink will be described below in detail.

Self-Dispersible Pigment

The self-dispersible pigment is used as a coloring material of the ink according to aspects of the present invention. Examples of usable pigment species include inorganic pigments, e.g., carbon black, calcium carbonate and titanium oxide; and organic pigments, e.g., azo, phthalocyanine and quinacridone. For the purposes of tone adjustment and the like, dye and the like may be used in combination in addition to the pigment. The content (percent by mass) of the self-dispersible pigment in the ink is preferably 0.1 percent by mass or more and 15.0 percent by mass or less, and further preferably 1.0 percent by mass or more and 10.0 percent by mass or less with reference to the total mass of the ink.

In the self-dispersible pigment contained in the ink, the first functional group including the phosphonic acid group and the second functional group including at least one of the carboxylic acid group and the sulfonic acid group are chemically bonded to the surface of the pigment particle. The first functional group including the phosphonic acid group does not include the carboxylic acid group and the sulfonic acid group. This is because the effect of enhancing the color developability of an image by the ink is hindered, where the ink contains the self-dispersible pigment with the functional group including the anionic group, which is only the phosphonic acid group, as described above.

In the ink, a phosphonic acid group, —PO(O[$M_1$])$_2$, may be in the state of being partly dissociated or in the state of being wholly dissociated. That is, the phosphonic acid group may take any form of —PO$_3$H$_2$ (acid type), —PO$_3$H$^-$M$_1^+$ (monobasic salt) and —PO$_3^{2-}$(M$_1^+$)$_2$ (dibasic salt). Here, $M_1$ represents independently at least one type selected from the group consisting of a hydrogen atom, an alkali metal, ammonium and organic ammonium. Examples of alkali metals represented by $M_1$ include lithium, sodium and potassium. Examples of organic ammonium represented by $M_1$ include alkylamines having the carbon number of 1 or more and 3 or less, e.g., methylamine and ethylamine; and alkanolamines having the carbon number of 1 or more and 4 or less, e.g., monoethanolamine, diethanolamine and triethanolamine. In the present invention, two phosphonic acid groups can be included in the first functional group including the phosphonic acid group. As a matter of course, it is possible to enhance the color developability of an image even when one phosphonic acid group is included in the first functional group. However, in the case where two phosphonic acid groups are included in the first functional group, the color developability of an image is more enhanced. If three or more phosphonic acid groups are included in the first functional group, the storage stability of the ink is not obtained sufficiently in some cases.

Meanwhile, the phosphonic acid group can be present at a terminal of the first functional group, that is, other atomic group can be present between the surface of the pigment particle and the phosphonic acid group. Examples of other atomic groups (—R—) include straight chain or branched alkylene groups having the carbon number of 1 to 12, arylene groups, e.g., a phenylene group and a naphthylene group, amide groups, sulfonyl groups, amino groups, carbonyl groups, ester groups and ether groups. In addition, examples include groups by combination of some of these groups. In particular, the other atomic group can have at least one of an alkylene group and an arylene group and a group exhibiting a hydrogen bonding property (amide groups, sulfonyl groups, amino groups, carbonyl groups, ester groups and ether groups). In aspects of the present invention, especially —$C_6H_5$—CONH— (benzamide structure) can be included in the first functional group.

In aspects of the present invention, furthermore, the structure of —$CQ(PO_3[M_1]_2)_2$ can be included in the first functional group bonded to the surface of the pigment particle. In the formula, Q represents any one of a hydrogen atom, R, OR, SR and $NR_2$, and R represents independently any one of a hydrogen atom, an alkyl group, an acyl group, an aralkyl group and an aryl group. In the case where R represents a group including a carbon atom, the number of carbon atoms included in the group is preferably 1 to 18. Specific examples include alkyl groups, e.g., a methyl group and an ethyl group; acyl groups, e.g., an acetyl group and a benzoyl group; aralkyl groups, e.g., a benzyl group; and aryl groups, e.g., a phenyl group and a naphthyl group. In this regard, $M_1$ represents independently at least one type selected from the group consisting of a hydrogen atom, an alkali metal, ammonium and organic ammonium. In aspects of the present invention, in particular, the first functional group including the structure of —$CH(PO_3[M_1]_2)_2$, where Q described above represents a hydrogen atom, can be bonded to the surface of the pigment particle.

In the second functional group including at least one of the carboxylic acid group and the sulfonic acid group as well, these anionic groups can be present at a terminal of the functional group, that is, other atomic group (—R—) can be present between the surface of the pigment particle and these acid groups. Examples of other atomic groups include the same groups as the above-described groups. In the ink, a carboxylic acid group (—$COOM_1$) or a sulfonic acid group (—$SO_3M_1$) may be either in the state of being partly dissociated or in the state of being wholly dissociated. Examples of $M_1$ include the same as those described above. In aspects of the present invention, in particular, the other group (—R—) in the second functional group can be a straight chain or branched alkylene group having the carbon number of 1 to 12 or an arylene group, e.g., a phenylene group or a naphthylene group. In the second embodiment, the second functional group including a sulfonic acid group is used.

In the main embodiment of the present invention (first embodiment), it is necessary that the introduced amount of each functional group is specified to be as described below. It is necessary to adjust the introduced amount of the first functional group in such a way that the surface charge amount derived from the phosphonic acid group included in the first functional group becomes 0.3 micromoles/$m^2$ or more. The surface charge amount derived from the phosphonic acid group included in the first functional group is further preferably 0.5 micromoles/$m^2$ or more. If the surface charge amount derived from the phosphonic acid group included in the first functional group is less than 0.3 micromoles/$m^2$, the color developability of an image is not obtained. The upper limit of the surface charge amount derived from the phosphonic acid group included in the first functional group is preferably 3.0 micromoles/$m^2$ or less. Meanwhile, it is necessary to adjust the introduced amount of the second functional group in such a way that the total surface charge amount derived from the carboxylic acid group and the sulfonic acid group included in the second functional group becomes 1.0 micromoles/$m^2$ or more. If the total surface charge amount derived from the carboxylic acid group and the sulfonic acid group included in the second functional group is less than 1.0 micromoles/$m^2$, the intermittent ejection stability is not obtained. The upper limit of the total surface charge amount derived from the carboxylic acid group and the sulfonic acid group included in the second functional group is preferably 7.7 micromoles/$m^2$ or less.

Furthermore, it is necessary to adjust the total introduced amount of the first functional group and the second functional group in such a way that the total surface charge amount derived from anionic groups included in the first functional group and the second functional group becomes 2.0 micromoles/$m^2$ or more and 8.0 micromoles/$m^2$ or less. The total surface charge amount derived from anionic groups included in the first functional group and the second functional group is further preferably 2.5 micromoles/$m^2$ or more and 6.0 micromoles/$m^2$ or less, and particularly preferably 2.5 micromoles/$m^2$ or more and 5.0 micromoles/$m^2$ or less. If the total surface charge amount derived from anionic groups included in the first functional group and the second functional group is less than 2.0 micromoles/$m^2$, the intermittent ejection stability is not obtained, and if more than 8.0 micromoles/$m^2$, the color developability of an image is not obtained.

In the second embodiment according to the present invention, in addition to the indispensable conditions of the self-dispersible pigment in the first embodiment, the second functional group can have the sulfonic acid group, and the surface charge amount derived from the sulfonic acid group included in the second functional group can be adjusted to 1.0 micromoles/$m^2$ or more. If the surface charge amount derived from the sulfonic acid group included in the second functional group is less than 1.0 micromoles/$m^2$ or more, in some cases, the long-term ejection stability is not obtained sufficiently when the ink containing a free copper ion is applied to the thermal method. The upper limit of the surface charge amount derived from the sulfonic acid group included in the second functional group is preferably 7.7 micromoles/$m^2$ or less.

In the third embodiment according to the present invention, in addition to the indispensable conditions of the self-dispersible pigment in the first embodiment, the surface charge amount derived from the phosphonic acid group included in the first functional group can be adjusted to 2.0 micromoles/$m^2$ or more. If the surface charge amount derived from the phosphonic acid group included in the first functional group is less than 2.0 micromoles/$m^2$, when the ink containing the free copper ion is brought into contact with the synthetic rubber contained in the ink jet recording apparatus, deformation and swelling of the synthetic rubber are not suppressed sufficiently in some cases. The upper limit of the surface charge amount derived from the phosphonic acid group included in the first functional group is preferably 3.0 micromoles/m$^2$ or less.

As a matter of course, the above-described first embodiment, second embodiment and third embodiment may be combined. That is, in the case where an ink containing the free copper ion is applied to an ink jet recording apparatus in which synthetic rubber is contained in a member to be brought into contact with the ink and which is provided with a thermal method recording head, the combination of the above-described conditions can be satisfied. Specifically, the surface charge amount derived from the phosphonic acid group included in the first functional group is preferably 2.0 micromoles/m$^2$ or more, the surface charge amount derived from the sulfonic acid group included in the second functional group is preferably 1.0 micromoles/m$^2$ or more, and the total surface charge amount derived from anionic groups included in the first functional group and the second functional group is preferably 2.0 micromoles/m$^2$ or more and 8.0 micromoles/m$^2$ or less.

The measurement of the surface charge amount derived from anionic groups included in the first functional group and the second functional group which is bonded to the self-dispersible pigment is performed by a colloidal titration method. This method has merits, that is, in the case where the amount of anionic groups per unit surface area of pigment is determined, this method is simple as compared with the conventional method in which the amount of anionic groups is determined on the basis of quantification of counter ions, the accuracy is high, and the amount of anionic groups is measured directly. In the examples described later, the surface charge amount of the pigment in a pigment dispersion was measured by using an automatic potentiometric titrator (trade name "AT-510"; produced by Kyoto Electronics Manufacturing Co., Ltd.) equipped with a stream potential titration unit (PCD-500) on the basis of colloidal titration utilizing a potential difference. At this time, methyl glycol chitosan was used as a titrant. As a matter of course, it is also possible to measure the surface charge amount by using a pigment extracted from an ink by an appropriate method.

Meanwhile, among the surface charge amount derived from anionic groups included in the functional group which is bonded to the self-dispersible pigment, the surface charge amount derived from the first functional group including the phosphonic acid group is calculated from the quantitative value of phosphorus atom on the basis of an ICP emission spectrochemical analyzer and NMR. More specifically, the amount of phosphorus atom is determined by using the ICP emission spectrochemical analyzer. In the whole phosphorus atoms included in the self-dispersible pigment, the proportion of phosphorus atoms derived from the first functional group including the phosphonic acid group is specified by analyzing the structure thereof on the basis of NMR and the like. The number of dissociation of the phosphonic acid group in the ink is determined by using potentiometric titration and the like. The number of dissociation of the phosphonic acid group is 1 in the pH range of 8 to 10 which is a pH range of an ink used usually.

The specific surface area of the self-dispersible pigment used in aspects of the present invention is preferably 50 m$^2$/g or more and 250 m$^2$/g or less. If the specific surface area is less than 50 m$^2$/g, the particle diameter of the pigment in the state of being dispersed in an ink tends to become large, and the storage stability of the ink may be degraded to some extent.

On the other hand, if the specific surface area is more than 250 m$^2$/g, the introduced amount of the first functional group including the phosphonic acid group per unit mass increases, the viscosity of the ink increases because of aggregation of the pigment when evaporation of water and the like in the ink proceeds, and the intermittent ejection stability of the ink may be degraded to some extent. The specific surface area in the present invention is a value measured by a nitrogen adsorption method (BET method) on the basis of the Brunaur-Emmett-Teller method.

Free Copper Ion

The second embodiment and the third embodiment according to the present invention are predicated that a free copper ion is present in the ink. This free copper ion refers to a copper ion which does not constitute a coordinate structure with other substances and which is present in the state of being dissolved in an aqueous medium constituting the ink. Therefore, for example, a copper ion contained as a center atom of a phthalocyanine structure, that is, a copper ion constituting a coordinate structure, is not included in the free copper ion according to the aspects of the present invention. The copper ion constituting the coordinate structure does not cause the technical issues to be solved in the second and third embodiments.

Various factors are mentioned as reasons for presence of the free copper ion in the ink. For the purpose of enhancing the color developability and the like, control may be performed in such a way that the free copper ion is added to an ink intentionally to increase the electrolyte concentration in the ink and, thereby, the pigment is aggregated in a recording medium after water and the like are evaporated. Meanwhile, the free copper ion may be unintentionally mixed as impurities of various materials, e.g., a coloring material and a water-soluble organic solvent, constituting the ink. The free copper ion may be eluted from members and the like constituting an ink cartridge and the free copper ion may be mixed into an ink. In addition, in the case where a pigment having a copper phthalocyanine skeleton (C.I. Pigment Blue 15:3, C.I. Pigment Blue 15:4 and the like) is used as the coloring material of an ink, the free copper ion may be mixed as impurities thereof. In this regard, the content of the free copper ion in common deionized water or ion-exchanged water is less than or equal to the detection limit.

The content (ppm) of the free copper ion in the ink is preferably 50 ppm or less, and further preferably 30 ppm or less with reference to the ink mass. If the content of the free copper ion is more than 50 ppm, the long-term ejection stability may not be obtained sufficiently or deformation or swelling of the synthetic rubber may not be suppressed sufficiently. In the second and third embodiments, the lower limit of the free copper ion content (ppm) in the ink is more than 0 ppm. On the other hand, in the first embodiment, the lower limit of the free copper ion content (ppm) in the ink is 0 ppm or more, that is, no free copper ions may be present. The free copper ion content in the ink may be measured by a known method. For example, after the ink is dried under reduced pressure, the free copper ion is extracted by using hydrochloric acid and is quantified by a known method, e.g., ICP emission spectrochemical analysis, and the content in the ink is determined by conversion.

In the third embodiment, the total amount of phosphonic acid groups included in the first functional group is preferably 10.0 times the content of the free copper ion in the ink on a molar ratio basis. If the total amount of phosphonic acid groups included in the first functional group is less than 10.0 times the content of the free copper ion in the ink on a molar ratio basis, deformation or swelling of the synthetic rubber may not be suppressed sufficiently. This is considered to be related to the capability of the phosphonic acid group to form a chelate structure with the free copper ion and it is considered that if the amount of phosphonic acid group is small, the free copper ion is not captured effectively by the phosphonic acid group. The upper limit of the above-described molar ratio is preferably 10,000 times or less.

Aqueous Medium

The ink according to aspects of the present invention can contain an aqueous medium which is water or a mixed solvent of water and a water-soluble organic solvent. As for the water, deionized water or ion-exchanged water can be used. The ink according to aspects of the present invention is an aqueous ink containing at least water as an aqueous medium. The content (percent by mass) of water in the ink is preferably 40.0 percent by mass or more and 95.0 percent by mass or less with reference to the total mass of the ink. As for the water-soluble organic solvent, any solvent usable for an ink jet ink, e.g., alcohols, glycols, glycol ethers and nitrogen-containing compounds, may be used, and at least one type of them may be contained in the ink. The water-soluble organic solvent can have a vapor pressure lower than that of water at 25 degrees Celsius. The content (percent by mass) of the water-soluble organic solvent in the ink is preferably 3.0 percent by mass or more and 50.0 percent by mass or less, and further preferably 20.0 percent by mass or more and 25.0 percent by mass or less with reference to the total mass of the ink. In the case where at least one of a compound represented by Formula (1) described later and a compound represented by Formula (2) is used, the value of this content includes the content of the compound.

In order to further enhance the color developability of an image and the intermittent ejection stability of the ink, the present inventors pursued the mechanism of enhancement in the above-described intermittent ejection stability of the ink and performed studies. Specifically, studies were performed to intentionally control the conformability of the above-described self-dispersible pigment to water on the basis of the type of the water-soluble organic solvent contained in the ink together with the self-dispersible pigment and maintain the dispersion state more stably with ease. As a result, the intermittent ejection stability of the ink was further improved by containing at least one of the compound represented by Formula (1) described below and the compound represented by Formula (2) described below as the water-soluble organic solvent into the ink. The content (percent by mass) of at least one of the compound represented by Formula (1) described below and the compound represented by Formula (2) described below is preferably 0.5 percent by mass or more and 10.0 percent by mass or less with reference to the total mass of the ink. In the case where the compound represented by Formula (1) and the compound represented by Formula (2) are used in combination, this range of the content is a total content thereof.

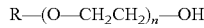

R—(O—CH$_2$CH$_2$)$_n$—OH  Formula (1)

(where n represents an integer of 3 or more and 30 or less, R represents a hydrogen atom or C$_m$H$_{2m+1}$ and m represents an integer of 1 or more and 4 or less)

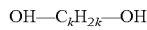

OH—C$_k$H$_{2k}$—OH  Formula (2)

(where k represents an integer of 4 or more and 6 or less)

Examples of compounds in which R in Formula (1) is a hydrogen atom include triethylene glycol, tetraethylene glycol and polyethylene glycol having a number average molecular weight of 200 to 1,000. Examples of compounds in which R in Formula (1) is C$_m$H$_{2m+1}$ include ethylene glycol monoethyl ether, diethylene glycol monobutyl ether, triethylene glycol monopropyl ether and triethylene glycol monobutyl ether. Examples of compounds represented by Formula (2) include 1,4-butanediol, 1,5-pentanediol and 1,6-hexanediol.

It is confirmed that the compounds represented by Formula (1) and Formula (2) are water-soluble organic solvents which exhibit relatively high hydrophobicity, which is capable of forming a hydrogen bond with water, and which has a vapor pressure lower than that of water at 25 degrees Celsius, so as to function to reduce the water activity. If such a water-soluble organic solvent is present in the ink, the water activity is reduced and, thereby, formation of a hydrogen bond between the anionic group of the self-dispersible pigment and the water molecule is hindered. As a result, the conformability of the self-dispersible pigment to the water is reduced. In the case where water in the ink containing such a water-soluble organic solvent is evaporated from an ejection orifice, the concentration of water in the vicinity of the ejection orifice decreases sharply and, conversely, the concentration of the above-described water-soluble organic solvent increases sharply. As a result, the self-dispersible pigment moves in the direction of high water concentration where the dispersion state thereof is maintained more stably with ease because of the conformability to water. Consequently, the intermittent ejection stability of an image is further improved.

For the purpose of comparison, the present inventors applied the above-described water-soluble organic solvent, which had exerted the effect on further improvement in the intermittent ejection stability of the ink, to an ink containing a self-dispersible pigment having the phosphonic acid group in the related art. However, in this case, the effect of improving the intermittent ejection stability of the ink was not obtained. The reason for this is estimated that such a self-dispersible pigment intrinsically exhibits poor conformability to water because of a low surface charge amount and, in addition, the conformability of the self-dispersible pigment to the water is not controlled easily because the self-dispersible pigment forms hydrophobic interaction with the water-soluble organic solvent.

Salt Constituted by Combining Cation and Anion

The ink according to aspects of the present invention can contain a salt constituted by combining a cation and an anion. Consequently, an image exhibiting further high color developability is obtained. The cation is at least one type selected from the group consisting of an alkali metal ion, an ammonium ion and an organic ammonium ion. The anion is at least one type selected from the group consisting of Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCO$_3^-$, HCOO$^-$, (COO$^-$)$_2$, COOH(COO$^-$), CH$_3$COO$^-$, C$_2$H$_4$(COO$^-$)$_2$, C$_6$H$_5$COO$^-$, C$_6$H$_4$(COO$^-$)$_2$, PO$_4^{3-}$, HPO$_4^{2-}$ and H$_2$PO$_4^-$. The form of the salt in the ink may be either in the state of being partly dissociated or in the state of being wholly dissociated.

As for salts constituted by combining the cation and the anion, the following salts are mentioned. Examples include (M$_2$)Cl, (M$_2$)Br, (M$_2$)I, (M$_2$)ClO, (M$_2$)ClO$_2$, (M$_2$)ClO$_3$, (M$_2$)ClO$_4$, (M$_2$)NO$_2$, (M$_2$)NO$_3$, (M$_2$)$_2$SO$_4$, (M$_2$)$_2$CO$_3$, (M$_2$)HCO$_3$, HCOO(M$_2$), (COO(M$_2$))$_2$, COOH(COO(M$_2$)), CH$_3$COO(M$_2$), C$_2$H$_4$(COO(M$_2$))$_2$, C$_6$H$_5$COO(M$_2$), C$_6$H$_4$(COO(M$_2$))$_2$, (M$_2$)$_3$PO$_4$, (M$_2$)$_2$HPO$_4$ and (M$_2$)H$_2$PO$_4$. The above-described M$_2$ represents at least one type selected from the group consisting of an alkali metal ion, an ammonium ion and an organic ammonium ion. Examples of alkali metal ions include a lithium ion, a sodium ion and a potassium ion. Examples of organic ammonium include alkylamines having the carbon number of 1 or more and 3 or less, e.g., methylamine and ethylamine; and alkanolamines having the carbon number of 1 or more and 4 or less, e.g., monoethanolamine, diethanolamine and triethanolamine. In particular, $M_2$ can be a potassium ion from the viewpoint of the color developability of an image and the storage stability of the ink.

In aspects according to the present invention, the anion constituting the salt can be, in particular, at least one type selected from the group consisting of $C_2H_4(COO^-)_2$, $C_6H_4(COO^-)_2$ and $SO_4^{2-}$. The salts constituted containing these anions can be employed because the dispersion stability of the pigment is especially excellent even when water and the like in the ink are evaporated. The enhancement in the color developability due to the salt occurs because the electrolyte concentration in the ink increases, an electric double layer is compressed more easily and, thereby, aggregation of the pigment is facilitated. Therefore, from the viewpoint of enhancement in the color developability, it can be said that the electrolyte concentration in the ink, that is, the number of moles of the salt, is more dominant than the type of ion constituting the salt.

The content (percent by mass) of the salt in the ink is preferably 0.05 percent by mass or more and 2.0 percent by mass or less, and further preferably 0.1 percent by mass or more and 1.0 percent by mass or less with reference to the total mass of the ink, although being different depending on the molecular weight of the salt. If the content of the salt is less than 0.05 percent by mass, an effect of further enhancing the color developability of an image recorded on a recording medium, e.g., plain paper, which is the original purpose, is not obtained sufficiently in some cases. On the other hand, if the content of the salt is more than 2.0 percent by mass, a high level of storage stability of the ink is not obtained sufficiently in some cases.

The present inventors studied the influence of addition of the salt to the ink on the intermittent ejection stability of the ink and the color developability of an image. Specifically, examination was performed by using two types of the inks, that is, the ink according to an aspect of the present invention containing a predetermined self-dispersible pigment and a conventional ink containing a self-dispersible pigment having the phosphonic acid group. As a result, the intermittent ejection stability of the ink according to an aspect of the present invention was not degraded, whereas that of the conventional ink was degraded significantly. The reason for this is confirmed to be that phosphonic acid groups in the state of ionic dissociation were reduced significantly because of addition of the salt, in addition, water and the like in the ink were evaporated in the vicinity of the ejection orifice, the dispersion state of the pigment became unstable and, thereby, an increase in viscosity of the ink due to aggregation occurred rapidly. On the other hand, as for the carboxylic acid group or the sulfonic acid group included in the second functional group in the ink according to an aspect of the present invention, even when the salt was added, reduction in anionic groups in the state of ion dissociation was mild. Then, it is confirmed that even when water and the like in the ink were evaporated in the vicinity of the ejection orifice and phosphonic acid groups in the state of ionic dissociation were reduced significantly, the dispersion state of the pigment is suppressed from becoming unstable sufficiently by the presence of carboxylic acid group or sulfonic acid group in the state of ionic dissociation.

Meanwhile, enhancement in the color developability of an image due to addition of the salt was ascertained in both the ink according to an aspect of the present invention and the conventional ink. In the self-dispersible pigment contained in the ink according to an aspect of the present invention, the carboxylic acid group or the sulfonic acid group included in the second functional group are present in the state of ionic dissociation easily and, therefore, the dispersion state of the pigment is suppressed from becoming unstable in the vicinity of the ejection orifice, as described above. However, in recording of an image, evaporation of water and the like and solid-liquid separation proceed in the recording medium provided with the ink and compression of the electric double layer occurs because of the salt, so that mutual approach of particles of the self-dispersible pigment in the ink is facilitated. Consequently, even when the second functional group is present, the cross-linking structure between the phosphonic acid groups included in the first functional group bonded to the pigment is formed further easily. As a result, it is confirmed to become possible to obtain an image exhibiting higher color developability.

Water-Soluble Resin

A specific water-soluble resin can be contained in the ink according to an aspect of the present invention. Consequently, it becomes possible to obtain an image exhibiting higher color developability with respect to some type of recording medium, specifically, for example, plain paper containing polyvalent cations, e.g., calcium ion, to a relatively large extent. As for the water-soluble resin which can be contained in the ink according to an aspect of the present invention, at least one of an acrylic resin and an urethane resin is mentioned. The acid value of the acrylic resin is preferably 100 mgKOH/g or more and 160 mgKOH/g or less. The acid value of the urethane resin is preferably 40 mgKOH/g or more and 120 mgKOH/g or less. In the present specification, the term "resin is water-soluble" refers to that when this resin is neutralized by alkali equivalent to the acid value, no particle having a measurable particle diameter is formed. The resin satisfying such a condition is referred to as a water-soluble resin in the present specification. The term "(meth)acryl" in the present specification refers to acryl and methacryl.

When an ink containing such a water-soluble resin is applied to a recording medium, polyvalent cations contained in the recording medium are dissolved into the ink, and the water-soluble resin in the dissolved state becomes insoluble rapidly so as to be precipitated. Likewise, the dispersion state of the self-dispersible pigment becomes unstable because of polyvalent cations. As a result, it is confirmed that the water-soluble resin, which has become insoluble, takes in the pigment in the unstable dispersion state so as to form a larger aggregate and obtain an image exhibiting higher color developability. On the other hand, in the case where the acid value is lower than the range specified as described above, the resin has low water solubility and, therefore, is present not in the dissolved state, but in the state of having a particle diameter (dispersed state, that is, the state of emulsion or dispersion) in the ink. In this case, even when the polyvalent cation concentration in the ink of the recording medium increases, a large aggregate is not formed because the resin is originally in the phase-separated state and is not newly precipitated, and in some cases, an effect of further enhancing the color developability of an image is not obtained sufficiently. Meanwhile, in the case where the acid value is higher than the range specified as described above, the resin has too high water solubility and, therefore, even when the polyvalent cation concentration in the ink of the recording medium increases, the proportion of resin still maintaining the dissolved state is large. In this case as well, a large aggregate is not formed, and in some cases, an effect of further enhancing the color developability of an image is not obtained sufficiently.

The suitable ranges of the acid values of the acrylic resin and the urethane resin are different because the hydrophilicity/hydrophobicity of the main structures of the respective resins are different and, thereby, the ranges of acid values suitable for efficient aggregation on the recording medium are different.

In the case where the water-soluble resin was added to the conventional ink containing the self-dispersible pigment having the phosphonic acid group, the degree of enhancement in the color developability was limitative. The reason for this is confirmed to be that the water-soluble resin is adsorbed by the surface of pigment particles because the surface charge amount of the pigment is low and the water-soluble resin in the dissolved state is prevented from becoming insoluble rapidly. In addition, it is also considered that the dispersion state of the self-dispersible pigment is stabilized by adsorption of the water-soluble resin. This may contributes to the fact that enhancement in the color developability was not observed.

In the case where the water-soluble resin was added to the conventional ink containing the self-dispersible pigment having many carboxylic acid groups or sulfonic acid groups as well, the color developability was not enhanced to a large extent. The reason for this is estimated to be that the aggregability of the pigment is originally low, and the timings of formation of aggregate on the recording medium of the water-soluble resin and the self-dispersible pigment are different.

The weight average molecular weight of the water-soluble resin is preferably 5,000 or more and 200,000 or less as a weight average molecular weight in terms of polystyrene obtained by gel permeation chromatography (GPC). If the weight average molecular weight is less than 5,000, even when salts, e.g., calcium, contained in the recording medium are dissolved into the ink applied to the recording medium, large aggregates are not formed easily, and in some cases, an effect of enhancing the color developability of an image is not obtained sufficiently. On the other hand, if the weight average molecular weight is more than 200,000, the viscosity of the ink becomes too high, and in some cases, a sufficiently high level of ejection stability of the ink is not obtained.

The content (percent by mass) of the water-soluble resin in the ink is preferably 0.5 percent by mass or more and 5.0 percent by mass or less with reference to the total mass of the ink. If the content of the water-soluble resin is less than 0.5 percent by mass, an effect of enhancing the color developability of an image recorded on a recording medium, e.g., plain paper, which is the original purpose, may not be obtained sufficiently. On the other hand, if the content of the water-soluble resin is more than 5.0 percent by mass, the viscosity of the ink becomes too high, and in some cases, a sufficiently high level of ejection stability of the ink is not obtained.

In the case where the water-soluble resin is contained in the ink, when a salt formed by bonding between a cation and an anion is further used, an alkali metal ion can be selected as the cation of the salt. If an ammonium ion or an organic ammonium ion is used as the cation of the salt, exchange with a counter ion of the water-soluble resin occurs easily, and the water solubility of the resin is reduced easily. Therefore, in some cases, sufficiently high levels of storage stability and ejection stability of the ink are not obtained.

Specifically, the acrylic resin can be a copolymer having at least a hydrophilic unit and a hydrophobic unit, as described below, as constituent units.

As for a monomer which becomes a hydrophilic unit by polymerization and which has a hydrophilic group, the following monomers are mentioned. Examples include acid monomers having a carboxy group, e.g., (meth)acrylic acid, itaconic acid, maleic acid, and fumaric acid, acid monomers having a phosphonic acid group, e.g., (meth)acrylic acid-2-phosphonic acid ethyl and anionic monomers, e.g., anhydrides and salts of these acid monomers; monomers having a hydroxy group, e.g., 2-hydroxyethyl (meth)acrylate and 3-hydroxypropyl (meth)acrylate; and monomers having an ethylene oxide group, e.g., methoxy(mono,di,tri,poly)ethylene glycol (meth)acrylate. Examples of cations constituting salts of the above-described anionic monomers include ions of lithium, sodium, potassium, ammonium and organic ammonium. The resin can be a resin which becomes water-soluble by being neutralized by neutralizing agents, e.g., hydroxides of alkali metals (lithium, sodium, potassium and the like) and ammonia water.

As for a monomer which becomes a hydrophobic unit by polymerization and which has a hydrophobic group, the following monomers are mentioned. Examples include monomers having an aromatic ring, e.g., styrene, alpha-methyl styrene and benzyl (meth)acrylate; and monomers having an aliphatic group, e.g., ethyl (meth)acrylate, methyl (meth)acrylate, (n-,iso-)propyl (meth)acrylate, (n-,iso-,t-)butyl (meth)acrylate and 2-ethylhexyl (meth)acrylate.

In aspects of the present invention, in particular, a copolymer having at least a hydrophilic unit derived from a monomer having a carboxy group and a hydrophobic unit derived from a monomer having an aromatic ring or a monomer having an aliphatic group can be used as the water-soluble acrylic resin.

The urethane resin can be obtained by a reaction between polyisocyanate and polyol or a chain extender may be further reacted. Examples of polyisocyanates include aliphatic, alicyclic, aromatic and araliphatic polyisocyanates. Examples of polyols include polyester polyol, polyether polyol and polycarbonate polyol, and these polyols may further have an acid group. In aspects of the present invention, both a polyether polyol and a diol having an acid radical can be used as the polyol, and the acid value of the urethane resin is adjusted by the proportion of the diol having an acid radical. The chain extender is a compound which reacts with isocyanate groups remaining without forming an urethane bond among polyisocyanate units of an urethane prepolymer obtained by a reaction between the polyisocyanate and the polyol.

Other Components

The ink according to an aspect of the present invention may contain organic compounds which are solid at ambient temperature, for example, trimethylolethane, trimethylolpropane and nitrogen-containing compounds, e.g., urea and ethyleneurea, besides the above-described components, as necessary. In addition to the above-described components, various additives, e.g., a surfactant, a pH regulator, an antifoaming agent, a rust inhibitor, an antiseptic, a fungicide, an antioxidant, a reduction inhibitor and a vaporization promoter, may be further contained in the ink, as necessary.

Properties of Ink

The ink according to aspects of the present invention has an ink viscosity of 1.0 mPas or more and 5.0 mPas or less, and further preferably 1.5 mPas or more and 4.0 mPas or less at 25 degrees Celsius. The pH of the ink is preferably 5 or more and 9 or less at 25 degrees Celsius.

Ink Cartridge

The ink cartridge according to aspects of the present invention includes an ink and an ink storage portion to store the ink. The ink stored in the ink storage portion is the above-described ink according to aspects of the present invention. As for the structure of the ink cartridge, a structure in which the ink storage portion is formed from a negative pressure generation member-holding chamber to store a negative pressure generating member to hold the ink while being impregnated with the ink through the use of a negative pressure and an ink storage chamber to store the ink in the state of not being impregnated into the negative pressure generating member is mentioned. Alternatively, the ink storage portion may have a configuration in which the above-described ink storage chamber is not disposed and the whole amount of ink is held while being impregnated into the negative pressure generating member or a configuration in which the negative pressure generating member is not disposed and the whole amount of ink is stored while not being impregnated into the negative pressure generating member. Furthermore, the ink cartridge may take a form configured to have the ink storage portion and a recording head.

Ink Jet Recording Method

An ink jet recording method according to aspects of the present invention is a method in which an image is recorded on a recording medium by ejecting the above-described ink according to an aspect of the present invention from a recording head of an ink jet method. As for the method for ejecting the ink, a method in which mechanical energy is applied to the ink and a method in which thermal energy is applied to the ink are mentioned. In the first and third embodiments according to the present invention, any method described above can be adopted. The known steps may be employed as the steps of the ink jet recording method except that the ink according to aspects of the present invention is used.

In the second embodiment according to the present invention in which the free copper ion is present in the ink, the ink jet recording method by utilizing thermal energy can be adopted and the surface charge amount derived from the sulfonic acid group included in the second functional group is specified to be preferably 1 micromole/m$^2$ or more.

In the third embodiment according to the present invention in which the free copper ion is present in the ink, the ink jet recording apparatus including the member formed from the material containing the synthetic rubber can be used and the surface charge amount derived from the phosphonic acid group included in the first functional group is specified to be preferably 2.0 micromoles/m$^2$ or more. As for the member which is included in the ink jet recording apparatus, which is formed from the material containing the synthetic rubber, and which is to be brought into contact with the ink, the following members are mentioned. Examples include a member constituting the ink cartridge, a member constituting the ink path of the recording head, a member constituting the connection portion of the ink cartridge and the recording head, and a wiper to wipe the surface provided with the ejection orifice of the recording head (ejection orifice surface). Among them, at the wiper, evaporation of water and the like occur after contact with the ink and, therefore, a phenomenon in which the concentration of the free copper ion increases occurs easily after the evaporation. Consequently, in particular, the ink according to the third embodiment of the present invention can be applied to the ink jet recording apparatus in which the material constituting the wiper is synthetic rubber because an excellent effect is obtained.

As for the synthetic rubber, general-purpose rubber may be used. Examples include acrylic rubber, nitrile rubber, isoprene rubber, urethane rubber, ethylene propylene rubber, chlorosulfonated polyethylene rubber, epichlorohydrin rubber, chloroprene rubber, silicone rubber, styrene-butadiene rubber, butadiene rubber, fluororubber, butyl rubber and chlorinated butyl rubber. Among them, urethane rubber, ethylene propylene rubber, butyl rubber and chlorinated butyl rubber can be employed from the viewpoints of ease of molding and stability of the member, and in particular, urethane rubber is employed as the material constituting the wiper.

EXAMPLES

Next, aspects of the present invention will be described below further specifically with reference to examples and comparative examples. However, the present invention is not limited to the following examples within the bounds of not departing from the gist thereof. By the way, in the description of the amounts of components, the term "part" and "%" are on a mass basis, unless otherwise specified.

Preparation of Self-Dispersible Pigment

Mixing of 20 g (solid content) of pigment, the type and the specific surface area of which are shown in Table 1-1 and 1-2, treatment agents, the types and the amounts of which are shown in Table 1-1 and 1-2, nitric acid, the number of moles of which is equal to the (total) amount of the treatment agents, and 200 mL of pure water was performed. As for the treatment agents, "phosphonic acid" indicates ((4-aminobenzoylamino)-methane-1,1-diyl)bisphosphonic acid, "carboxylic acid" indicates p-aminobenzoic acid and "sulfonic acid" indicates p-aminobenzene sulfonic acid. However, (4-aminophenyl)-2-phosphonopropanoic acid was used as the treatment agent of self-dispersible pigment 51 and (4-aminophenyl)(phosphono)acetic acid was used as the treatment agent of self-dispersible pigment 52 (asterisk in Table 1-1 and 1-2). Mixing was performed by using Silverson Mixer at room temperature and 6,000 rpm to obtain a mixture. After 30 minutes were elapsed, potassium nitrate (the number of moles was equal to the (total) amount of the treatment agent) dissolved into small amount of water was added to this mixture gradually. The temperature of the mixture reached 60 degrees Celsius because of this mixing, and a reaction was allowed to proceed for 1 hour in this state. Thereafter, the pH of the mixture was adjusted to 10 by using potassium hydroxide aqueous solution. After 30 minutes were elapsed, 20 mL of pure water was added, and diafiltration was performed by using a spectrum membrane, so as to prepare a self-dispersible pigment. Water was added to the resulting self-dispersible pigment to prepare a pigment dispersion having a pigment content of 10.0%. In this regard, the number of the pigment dispersion corresponds to the number of the self-dispersible pigment in such a way that self-dispersible pigment 1 is contained in Pigment dispersion 1.

As for the surface charge amount derived from anionic groups included in the first functional group and the second functional group of the self-dispersible pigment (expressed as "Derived from whole anionic groups" in Table 1-1 and 1-2), the self-dispersible pigment in the pigment dispersion was measured. Specifically, measurement was performed on the basis of potentiometric titration by using an automatic potentiometric titrator (trade name "AT-510", produced by Kyoto Electronics Manufacturing Co., Ltd.) equipped with a stream potential titration unit (PCD-500), where methyl glycol chitosan was used as a titrant.

The surface charge amount derived from the phosphonic acid group included in the first functional group of the self-dispersible pigment (expressed as "Derived from phosphonic acid group" in Table 1-1 and 1-2) was measured as described below. Liquid A was prepared by diluting the pigment dispersion with pure water in such a way that the content of the pigment, which was a measuring object, became about 0.03%. Meanwhile, the pigment dispersion was subjected to ultracentrifugation under the condition of 5 degrees Celsius, 80,000 rpm, and 15 hours, a supernatant liquid, from which the self-dispersible pigment had been removed, was taken, and this was diluted by a factor of about 80 with pure water, so as to prepare Liquid B. Phosphorus of the thus obtained measurement samples of Liquid A and Liquid B was quantified by using an ICP emission spectrochemical analyzer (trade name "SPS5100", produced by SII Nano Technology Inc.). The amount of phosphonic acid group was determined from a difference in the resulting amounts of phosphorus of Liquid A and Liquid B. Here, the measurement result of the surface charge amount of self-dispersible pigment 31 including only a functional group including the phosphonic acid group was contrasted with the phosphonic acid group, and it was ascertained that the surface charge amount of 1 corresponds to phosphonic acid group 1. Then, the amount of the phosphonic acid group was taken as the surface charge amount derived from the functional group including the phosphonic acid group.

The surface charge amount derived from the sulfonic acid group included in the second functional group of the self-dispersible pigment (expressed as "Derived from sulfonic acid group" in Table 1-1 and 1-2) was measured as described below. Liquid A was prepared by diluting the pigment dispersion with pure water in such a way that the content of the pigment, which was a measuring object, became about 0.03%. Meanwhile, the pigment dispersion was subjected to ultracentrifugation under the condition of 5 degrees Celsius, 80,000 rpm, and 15 hours, a supernatant liquid, from which the self-dispersible pigment had been removed, was taken, and this was diluted by a factor of about 80 with pure water, so as to prepare Liquid B. Sulfur of the thus obtained measurement samples of Liquid A and Liquid B was quantified by using an ICP emission spectrochemical analyzer (trade name "SPS5100", produced by SII Nano Technology Inc.). The amount of sulfonic acid group was determined from a difference in the resulting amounts of sulfur of Liquid A and Liquid B. Here, the measurement results of the amounts of surface charge of self-dispersible pigments 36 and 38 including only a functional group including the sulfonic acid group were contrasted with the sulfonic acid group, and it was ascertained that the surface charge amount of 1 corresponds to sulfonic acid group 1. Then, the amount of the sulfonic acid group was taken as the surface charge amount derived from the sulfonic acid group.

The surface charge amount derived from the carboxylic acid group included in the second functional group of the self-dispersible pigment (expressed as "Derived from carboxylic acid group" in Table 1-1 and 1-2) was not able to be measured with the ICP emission spectrochemical analyzer and was calculated as described below. The amount was calculated by subtracting the surface charge amount derived from the functional group including the phosphonic acid group and the surface charge amount derived from the sulfonic acid group from the surface charge amount derived from anionic groups. That is, "derived from carboxylic acid group"="derived from whole anionic groups"−("derived from phosphonic acid group"+"derived from sulfonic acid group") was employed.

TABLE 1-1

Preparation conditions and characteristics of self-dispersible pigment

| No. of self-dispersible pigment | Pigment species | Specific surface area of pigment [m²/g] | Treatment agent [mmol] Phosphonic acid | Treatment agent [mmol] Carboxylic acid | Treatment agent [mmol] Sulfonic acid | Surface charge amount [micromoles/m²] Derived from phosphonic acid group | Surface charge amount [micromoles/m²] Derived from carboxylic acid group | Surface charge amount [micromoles/m²] Derived from sulfonic acid group | Surface charge amount [micromoles/m²] Derived from whole anionic groups |
|---|---|---|---|---|---|---|---|---|---|
| 1 | Carbon black | 200 | 2.2 | 8.9 | | 1.0 | 2.0 | | 3.0 |
| 2 | C.I. Pigment Blue 15:3 | 90 | 1.8 | 7.2 | | 1.0 | 2.0 | | 3.0 |
| 3 | C.I. Pigment Blue 15:4 | 90 | 1.8 | 7.2 | | 1.0 | 2.0 | | 3.0 |
| 4 | C.I. Pigment Red 122 | 130 | 6.5 | 26.0 | | 1.0 | 2.0 | | 3.0 |
| 5 | C.I. Pigment Yellow 74 | 60 | 6.0 | 24.0 | | 1.0 | 2.0 | | 3.0 |
| 6 | Carbon black | 200 | 2.2 | | 8.9 | 1.0 | | 2.0 | 3.0 |
| 7 | C.I. Pigment Blue 15:4 | 90 | 1.8 | | 7.2 | 1.0 | | 2.0 | 3.0 |
| 8 | Carbon black | 200 | 2.2 | 4.4 | 4.4 | 1.0 | 1.0 | 1.0 | 3.0 |
| 9 | Carbon black | 200 | 0.7 | 12.0 | | 0.3 | 2.7 | | 3.0 |
| 10 | Carbon black | 200 | 4.4 | 4.4 | | 2.0 | 1.0 | | 3.0 |
| 11 | Carbon black | 200 | 4.4 | | 4.4 | 2.0 | | 1.0 | 3.0 |
| 12 | Carbon black | 200 | 1.1 | 6.7 | | 0.5 | 1.5 | | 2.0 |
| 13 | Carbon black | 200 | 1.1 | | 6.7 | 0.5 | | 1.5 | 2.0 |
| 14 | Carbon black | 200 | 4.4 | 13.3 | | 2.0 | 3.0 | | 5.0 |
| 15 | Carbon black | 200 | 4.4 | | 13.3 | 2.0 | | 3.0 | 5.0 |
| 16 | Carbon black | 200 | 4.4 | 26.7 | | 2.0 | 6.0 | | 8.0 |
| 17 | Carbon black | 200 | 4.4 | | 26.7 | 2.0 | | 6.0 | 8.0 |
| 18 | C.I. Pigment Blue 15:4 | 90 | 0.5 | | 9.7 | 0.3 | | 2.7 | 3.0 |
| 19 | C.I. Pigment Blue 15:4 | 90 | 3.6 | 3.6 | | 2.0 | 1.0 | | 3.0 |
| 20 | C.I. Pigment Blue 15:4 | 90 | 3.6 | | 3.6 | 2.0 | | 1.0 | 3.0 |
| 21 | C.I. Pigment Blue 15:4 | 90 | 0.9 | 5.4 | | 0.5 | 1.5 | | 2.0 |
| 22 | C.I. Pigment Blue 15:4 | 90 | 0.9 | | 5.4 | 0.5 | | 1.5 | 2.0 |
| 23 | C.I. Pigment Blue 15:4 | 90 | 3.6 | 10.8 | | 2.0 | 3.0 | | 5.0 |
| 24 | C.I. Pigment Blue 15:4 | 90 | 3.6 | | 10.8 | 2.0 | | 3.0 | 5.0 |
| 25 | C.I. Pigment Blue 15:4 | 90 | 3.6 | 21.6 | | 2.0 | 6.0 | | 8.0 |
| 26 | C.I. Pigment Blue 15:4 | 90 | 3.6 | | 21.6 | 2.0 | | 6.0 | 8.0 |
| 27 | C.I. Pigment Yellow 74 | 45 | 4.5 | 18.0 | | 1.0 | 2.0 | | 3.0 |
| 28 | C.I. Pigment Yellow 74 | 50 | 5.0 | 20.0 | | 1.0 | 2.0 | | 3.0 |
| 29 | Carbon black | 250 | 2.8 | 11.1 | | 1.0 | 2.0 | | 3.0 |
| 30 | Carbon black | 260 | 2.9 | 11.6 | | 1.0 | 2.0 | | 3.0 |
| 31 | Carbon black | 200 | 6.7 | | | 3.0 | | | 3.0 |
| 32 | C.I. Pigment Blue 15:4 | 90 | 5.4 | | | 3.0 | | | 3.0 |
| 33 | Carbon black | 200 | 0.4 | 12.4 | | 0.2 | 2.8 | | 3.0 |
| 34 | C.I. Pigment Blue 15:4 | 90 | 0.4 | | 10.1 | 0.2 | | 2.8 | 3.0 |

TABLE 1-1-continued

Preparation conditions and characteristics of self-dispersible pigment

| No. of self-dispersible pigment | Pigment species | Specific surface area of pigment [m²/g] | Treatment agent [mmol] | | | Surface charge amount [micromoles/m²] | | | |
|---|---|---|---|---|---|---|---|---|---|
| | | | Phosphonic acid | Carboxylic acid | Sulfonic acid | Derived from phosphonic acid group | Derived from carboxylic acid group | Derived from sulfonic acid group | Derived from whole anionic groups |
| 35 | Carbon black | 200 | | 13.3 | | | 3.0 | | 3.0 |
| 36 | Carbon black | 200 | | | 13.3 | | | 3.0 | 3.0 |
| 37 | C.I. Pigment Blue 15:4 | 90 | | 10.8 | | | 3.0 | | 3.0 |
| 38 | C.I. Pigment Blue 15:4 | 90 | | | 10.8 | | | 3.0 | 3.0 |
| 39 | Carbon black | 200 | 4.7 | 4.0 | | 2.1 | 0.9 | | 3.0 |
| 40 | Carbon black | 200 | 4.7 | | 4.0 | 2.1 | | 0.9 | 3.0 |

TABLE 1-2

Preparation conditions and characteristics of self-dispersible pigment

| No. of self-dispersible pigment | Pigment species | Specific surface area of pigment [m²/g] | Treatment agent [mmol] | | | Surface charge amount [micromoles/m²] | | | |
|---|---|---|---|---|---|---|---|---|---|
| | | | Phosphonic acid | Carboxylic acid | Sulfonic acid | Derived from phosphonic acid group | Derived from carboxylic acid group | Derived from sulfonic acid group | Derived from whole anionic groups |
| 41 | C.I. Pigment Blue 15:4 | 90 | 3.8 | 3.2 | | 2.1 | 0.9 | | 3.0 |
| 42 | C.I. Pigment Blue 15:4 | 90 | 3.8 | | 3.2 | 2.1 | | 0.9 | 3.0 |
| 43 | Carbon black | 200 | 1.1 | 6.2 | | 0.5 | 1.4 | | 1.9 |
| 44 | Carbon black | 200 | 1.1 | | 6.2 | 0.5 | | 1.4 | 1.9 |
| 45 | Carbon black | 200 | 4.4 | 28.9 | | 2.0 | 6.5 | | 8.5 |
| 46 | Carbon black | 200 | 4.4 | | 28.9 | 2.0 | | 6.5 | 8.5 |
| 47 | C.I. Pigment Blue 15:4 | 90 | 0.9 | 5.0 | | 0.5 | 1.4 | | 1.9 |
| 48 | C.I. Pigment Blue 15:4 | 90 | 0.9 | | 5.0 | 0.5 | | 1.4 | 1.9 |
| 49 | C.I. Pigment Blue 15:4 | 90 | 3.6 | 23.4 | | 2.0 | 6.5 | | 8.5 |
| 50 | C.I. Pigment Blue 15:4 | 90 | 3.6 | | 23.4 | 2.0 | | 6.5 | 8.5 |
| 51 | Carbon black | 200 | | 6.7(*) | | 1.5 | 1.5 | | 3.0 |
| 52 | Carbon black | 200 | | 6.7(*) | | 1.5 | 1.5 | | 3.0 |
| 53 | C.I. Pigment Blue 15:3 | 90 | 1.8 | | 7.2 | 1.0 | | 2.0 | 3.0 |
| 54 | C.I. Pigment Blue 15:4 | 130 | 2.6 | | 10.4 | 1.0 | | 2.0 | 3.0 |
| 55 | C.I. Pigment Blue 15:4 | 90 | 1.8 | 7.2 | 7.2 | 1.0 | 2.0 | 2.0 | 5.0 |
| 56 | C.I. Pigment Blue 15:4 | 90 | 3.2 | | 4.3 | 1.8 | | 1.2 | 3.0 |
| 57 | C.I. Pigment Blue 15:4 | 130 | 2.6 | 10.4 | | 1.0 | 2.0 | | 3.0 |
| 58 | C.I. Pigment Blue 15:4 | 90 | 3.6 | 7.2 | | 2.0 | 2.0 | | 4.0 |
| 59 | C.I. Pigment Blue 15:4 | 90 | 3.6 | 7.2 | 1.8 | 2.0 | 2.0 | 0.5 | 4.5 |
| 60 | Carbon black | 200 | 5.6 | 6.7 | | 2.5 | 1.5 | | 4.0 |
| 61 | C.I. Pigment Blue 15:3 | 90 | 4.5 | 5.4 | | 2.5 | 1.5 | | 4.0 |
| 62 | C.I. Pigment Blue 15:4 | 90 | 4.5 | 5.4 | | 2.5 | 1.5 | | 4.0 |
| 63 | C.I. Pigment Blue 15:4 | 130 | 6.5 | 7.8 | | 2.5 | 1.5 | | 4.0 |
| 64 | Carbon black | 200 | 5.6 | | 6.7 | 2.5 | | 1.5 | 4.0 |
| 65 | C.I. Pigment Blue 15:3 | 90 | 4.5 | | 5.4 | 2.5 | | 1.5 | 4.0 |
| 66 | C.I. Pigment Blue 15:4 | 90 | 4.5 | | 5.4 | 2.5 | | 1.5 | 4.0 |
| 67 | C.I. Pigment Blue 15:4 | 130 | 6.5 | | 7.8 | 2.5 | | 1.5 | 4.0 |
| 68 | C.I. Pigment Blue 15:4 | 90 | 4.0 | | 6.5 | 2.2 | | 1.8 | 4.0 |
| 69 | C.I. Pigment Blue 15:4 | 90 | 3.6 | | 7.2 | 2.0 | | 2.0 | 4.0 |
| 70 | C.I. Pigment Blue 15:4 | 90 | 5.0 | | 5.4 | 2.8 | | 1.5 | 4.3 |
| 71 | C.I. Pigment Blue 15:4 | 90 | 5.4 | | 5.4 | 3.0 | | 1.5 | 4.5 |
| 72 | C.I. Pigment Blue 15:4 | 90 | 5.9 | | 5.4 | 3.3 | | 1.5 | 4.8 |
| 73 | C.I. Pigment Blue 15:4 | 90 | 3.4 | | 7.6 | 1.9 | | 2.1 | 4.0 |

Synthesis of Resin

Each resin was synthesized in the procedure described below. The acid value of the resulting resin was determined by the following method. The resin was precipitated by adding hydrochloric acid to a resin aqueous solution. The resin was vacuum-dried at 40 degrees Celsius for a night. The resulting resin was dissolved into tetrahydrofuran, and the acid value was measured with the automatic potentiometric titrator (trade name "AT-510", produced by Kyoto Electronics Manufacturing Co., Ltd.) by using a potassium hydroxide methanol titrant. The weight average molecular weight of the resulting resin was measured as a weight average molecular weight in terms of polystyrene by using gel permeation chromatography (GPC).

Acrylic Resin

Each monomer (unit: part) shown in Table 2 was used and was copolymerized by a common method, so as to synthesize water-soluble Acrylic resins A1 to A7. A potassium hydroxide aqueous solution was used, whole anionic groups in the resin were neutralized, and ion-exchanged water was further added, so as to prepare an aqueous solution of each acrylic resin, where the content of resin (solid content) was 20.0%. The composition and the characteristics of the acrylic resin are shown in Table 2.

TABLE 2

Composition and characteristics of acrylic resin

| No. of acrylic resin | Composition | | | | | Characteristics | |
|---|---|---|---|---|---|---|---|
| | Styrene | α-Methyl styrene | Methyl methacrylate | Butyl acrylate | Acrylic acid | Acid value [mgKOH/g] | Weight average molecular weight |
| A1 | 48.4 | 40.0 | | | 11.6 | 90 | 10,000 |
| A2 | 47.1 | 40.0 | | | 12.9 | 100 | 10,000 |
| A3 | 44.6 | 40.0 | | | 15.4 | 120 | 10,000 |
| A4 | 44.6 | | | 40.0 | 15.4 | 120 | 10,000 |
| A5 | | | 44.6 | 40.0 | 15.4 | 120 | 10,000 |
| A6 | 39.4 | 40.0 | | | 20.6 | 160 | 10,000 |
| A7 | 38.1 | 40.0 | | | 21.9 | 170 | 10,000 |

Urethane Resin

A four-necked flask provided with a thermometer, an agitator, a nitrogen introduction tube, and a reflux tube was charged with a monomer, the usage (unit: part) of which is shown in Table 3, and 300.0 parts of methyl ethyl ketone, and a reaction was induced in a nitrogen gas atmosphere at 80 degrees Celsius for 10 hours. Thereafter, cooling to 40 degrees Celsius was performed, ion-exchanged water was added, and a potassium hydroxide aqueous solution was added while high-speed agitation was performed with a homomixer, so as to obtain a resin solution. The resulting resin solution was heated and decompressed to remove methyl ethyl ketone by distillation, and ion-exchanged water was further added, so as to obtain an aqueous solution of Urethane resins U1 to U7, where the content of resin (solid content) was 20.0%. The composition and the characteristics of the urethane resin are shown in Table 3. In Table 3, IPDI represents isophorone diisocyanate, HDI represents hexamethylene diisocyanate, PPG 2000 represents polypropylene glycol having a number average molecular weight of 2,000, PHCD 2000 represents polyhexamethylenecarbonate diol having a number average molecular weight of 2,000, and DMPA represents dimethylolpropionic acid.

TABLE 3

Composition and characteristics of urethane resin

| No. of urethane resin | Composition | | | | | Characteristics | |
|---|---|---|---|---|---|---|---|
| | IPDI | HDI | PPG 2000 | PHCD 2000 | DMPA | Acid value [mgKOH/g] | Weight average molecular weight |
| U1 | 21.6 | | 70.0 | | 8.4 | 35 | 20,000 |
| U2 | 23.3 | | 67.2 | | 9.5 | 40 | 20,000 |
| U3 | 39.9 | | 38.6 | | 21.5 | 90 | 20,000 |
| U4 | | 31.0 | 47.5 | | 21.5 | 90 | 20,000 |
| U5 | | 31.0 | | 47.5 | 21.5 | 90 | 20,000 |
| U6 | 49.9 | | 21.5 | | 28.6 | 120 | 20,000 |
| U7 | 53.2 | | 15.8 | | 31.0 | 130 | 20,000 |

Preparation of Ink

The respective components (unit: %) shown in upper parts of Tables 4 to 6 were mixed and agitated sufficiently. Thereafter, pressure filtration was performed with a microfilter (produced by FUJIFILM Corporation) having a pore size of 3.0 micrometers, so as to prepare each ink. In this regard, in Comparative example I-23, 15.0% each of Pigment dispersion 31 and Pigment dispersion 35 were used. Meanwhile, Acetylenol E100 is a surfactant produced by Kawaken Fine Chemicals Co., Ltd. The numerical value following the term "Polyethylene glycol" indicates a number average molecular weight.

Examples I-1 to I-88 and Comparative examples I-1 to I-23 correspond to the first embodiment, Examples II-1 to II-17 and comparative examples II-1 and II-2 correspond to the second embodiment, and Examples III-1 to III-25 correspond to the third embodiment.

As for the inks corresponding to the second and third embodiments, copper (II) chloride was added in such a way that the content (ppm) of the free copper ion present in the ink became the value indicated in the lower part of Tables 4 to 6, and the total was adjusted to 100.0% with ion-exchanged water. Therefore, the contents of the ion-exchanged water in the inks corresponding to the second and third embodiments are shown as values containing copper (II) chloride. As for the inks in which the coloring materials were not C.I. Pigment Blue 15:3 or C.I. Pigment Blue 15:4, in the case where copper (II) chloride was not added, the contents of the free copper ion were less than the detection limit (in Table, expressed as "ND"). On the other hand, as for the inks in which the coloring materials were C.I. Pigment Blue 15:3 or C.I. Pigment Blue 15:4, in the case where copper (II) chloride was not added, the contents of the free copper ion were 23 ppm.

The contents (ppm) of the free copper ion in the ink are shown in the lower part of Tables 4 to 6. This value was measured as described below. The prepared ink was dried under reduced pressure. Thereafter, the free copper ion was extracted by using hydrochloric acid, and copper was quantified with the ICP emission spectrochemical analyzer (trade name "SPS5100", produced by SII Nano Technology Inc.). The content of the free copper ion in the ink was calculated from the resulting quantified value of copper. As for the ink corresponding to the third embodiment, the value of molar ratio (time) of "total amount of phosphonic acid group included in first functional group/free copper ion" is also shown.

TABLE 4

Composition and characteristics of ink in first embodiment

| | Example | | | | | | | | | | | | |
|---|---|---|---|---|---|---|---|---|---|---|---|---|---|
| | I-1 | I-2 | I-3 | I-4 | I-5 | I-6 | I-7 | I-8 | I-9 | I-10 | I-11 | I-12 | I-13 |
| No. of pigment dispersion | 1 | 2 | 3 | 4 | 5 | 6 | 7 | 8 | 9 | 10 | 11 | 12 | 13 |
| No. of resin in resin aqueous solution | — | — | — | — | — | — | — | — | — | — | — | — | — |
| Amount of pigment dispersion | 30.0 | 30.0 | 30.0 | 50.0 | 30.0 | 30.0 | 30.0 | 30.0 | 30.0 | 30.0 | 30.0 | 30.0 | 30.0 |
| Amount of resin aqueous solution | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | | |
| Triethylene glycol | | | | | | | | | | | | | |
| Polyethylene glycol 200 | | | | | | | | | | | | | |
| Polyethylene glycol 1000 | | | | | | | | | | | | | |
| Polyethylene glycol 1500 | | | | | | | | | | | | | |
| Triethylene glycol monopentyl ether | | | | | | | | | | | | | |
| Triethylene glycol monobutyl ether | | | | | | | | | | | | | |
| 1,3-propanediol | | | | | | | | | | | | | |
| 1,4-butanediol | | | | | | | | | | | | | |
| 1,6-hexanediol | | | | | | | | | | | | | |
| 1,8-octanediol | | | | | | | | | | | | | |
| Potassium benzoate | | | | | | | | | | | | | |
| Sodium phthalate | | | | | | | | | | | | | |
| Potassium phthalate | | | | | | | | | | | | | |
| Ammonium phthalate | | | | | | | | | | | | | |
| Potassium sulfate | | | | | | | | | | | | | |
| Acetylenol E100 | 0.2 | 0.8 | 0.8 | 0.8 | 0.8 | 0.2 | 0.8 | 0.2 | 0.2 | 0.2 | 0.2 | 0.2 | 0.2 |
| Ion-exchanged water | 49.8 | 49.2 | 49.2 | 29.2 | 49.2 | 49.8 | 49.2 | 49.8 | 49.8 | 49.8 | 49.8 | 49.8 | 49.8 |
| Free copper ion content (ppm) | ND | 23 | 23 | ND | ND | ND | 23 | ND | ND | ND | ND | ND | ND |

| | Example | | | | | | | | | | | | |
|---|---|---|---|---|---|---|---|---|---|---|---|---|---|
| | I-14 | I-15 | I-16 | I-17 | I-18 | I-19 | I-20 | I-21 | I-22 | I-23 | I-24 | I-25 | I-26 |
| No. of pigment dispersion | 14 | 15 | 16 | 17 | 18 | 19 | 20 | 21 | 22 | 23 | 24 | 25 | 26 |
| No. of resin in resin aqueous solution | — | — | — | — | — | — | — | — | — | — | — | — | — |
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Amount of resin aqueous solution | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | | |
| Triethylene glycol | | | | | | | | | | | | | |
| Polyethylene glycol 200 | | | | | | | | | | | | | |
| Polyethylene glycol 1000 | | | | | | | | | | | | | |
| Polyethylene glycol 1500 | | | | | | | | | | | | | |
| Triethylene glycol monopentyl ether | | | | | | | | | | | | | |
| Triethylene glycol monobutyl ether | | | | | | | | | | | | | |
| 1,3-propanediol | | | | | | | | | | | | | |
| 1,4-butanediol | | | | | | | | | | | | | |
| 1,6-hexanediol | | | | | | | | | | | | | |
| 1,8-octanediol | | | | | | | | | | | | | |
| Potassium benzoate | | | | | | | | | | | | | |
| Sodium phthalate | | | | | | | | | | | | | |
| Potassium phthalate | | | | | | | | | | | | | |
| Ammonium phthalate | | | | | | | | | | | | | |
| Potassium sulfate | | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 49.8 | 49.8 | 49.8 | 49.8 | 49.8 | 49.8 | 49.8 | 49.8 | 49.8 | 49.8 | 49.8 | 49.8 | 49.8 |
| Free copper ion content (ppm) | ND | ND | ND | ND | 23 | 23 | 23 | 23 | 23 | 23 | 23 | 23 | 23 |

| | Example | | | | | | | | | | | | |
|---|---|---|---|---|---|---|---|---|---|---|---|---|---|
| | I-27 | I-28 | I-29 | I-30 | I-31 | I-32 | I-33 | I-34 | I-35 | I-36 | I-37 | I-38 | I-39 |
| No. of pigment dispersion | 27 | 28 | 29 | 30 | 1 | 1 | 1 | 3 | 6 | 7 | 1 | 1 | 1 |
| No. of resin in resin aqueous solution | — | — | — | — | — | — | — | — | — | — | — | — | — |

TABLE 4-continued

Composition and characteristics of ink in first embodiment

| | | | | | | | | | | | | | |
|---|---|---|---|---|---|---|---|---|---|---|---|---|---|
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Amount of resin aqueous solution | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | 5.0 | | | | | | | | |
| Triethylene glycol | | | | | | 5.0 | | | | | | | |
| Polyethylene glycol 200 | | | | | | | 5.0 | 5.0 | 5.0 | 5.0 | | | |
| Polyethylene glycol 1000 | | | | | | | | | | | 5.0 | | |
| Polyethylene glycol 1500 | | | | | | | | | | | | 5.0 | |
| Triethylene glycol monopentyl ether | | | | | | | | | | | | | 5.0 |
| Triethylene glycol monobutyl ether | | | | | | | | | | | | | |
| 1,3-propanediol | | | | | | | | | | | | | |
| 1,4-butanediol | | | | | | | | | | | | | |
| 1,6-hexanediol | | | | | | | | | | | | | |
| 1,8-octanediol | | | | | | | | | | | | | |
| Potassium benzoate | | | | | | | | | | | | | |
| Sodium phthalate | | | | | | | | | | | | | |
| Potassium phthalate | | | | | | | | | | | | | |
| Ammonium phthalate | | | | | | | | | | | | | |
| Potassium sulfate | | | | | | | | | | | | | |
| Acetylenol E100 | 0.2 | 0.2 | 0.2 | 0.2 | 0.2 | 0.2 | 0.2 | 0.8 | 0.2 | 0.8 | 0.2 | 0.2 | 0.2 |
| Ion-exchanged water | 49.8 | 49.8 | 49.8 | 49.8 | 44.8 | 44.8 | 44.8 | 44.2 | 44.8 | 44.2 | 44.8 | 44.8 | 44.8 |
| Free copper ion content (ppm) | ND | ND | ND | ND | ND | ND | ND | 23 | ND | 23 | ND | ND | ND |

| | Example | | | | | | | | | | | | |
|---|---|---|---|---|---|---|---|---|---|---|---|---|---|
| | I-40 | I-41 | I-42 | I-43 | I-44 | I-45 | I-46 | I-47 | I-48 | I-49 | I-50 | I-51 | I-52 |
| No. of pigment dispersion | 1 | 1 | 1 | 1 | 1 | 1 | 1 | 1 | 6 | 3 | 7 | 1 | 1 |
| No. of resin in resin aqueous solution | — | — | — | — | — | — | — | — | — | — | — | — | — |
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Amount of resin aqueous solution | | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | | |
| Triethylene glycol | | | | | | | | | | | | | |
| Polyethylene glycol 200 | | | | | | | | | | | | | |
| Polyethylene glycol 1000 | | | | | | | | | | | | | |
| Polyethylene glycol 1500 | | | | | | | | | | | | | |
| Triethylene glycol monopentyl ether | | | | | | | | | | | | | |
| Triethylene glycol monobutyl ether | 5.0 | | | | | | | | | | | | |
| 1,3-propanediol | | 5.0 | | | | | | | | | | | |
| 1,4-butanediol | | | 5.0 | | | | | | | | | | |
| 1,6-hexanediol | | | | 5.0 | | | | | | | | | |
| 1,8-octanediol | | | | | 5.0 | | | | | | | | |
| Potassium benzoate | | | | | | 0.2 | | | | | | | |
| Sodium phthalate | | | | | | | 0.2 | | | | | | |
| Potassium phthalate | | | | | | | | 0.2 | 0.2 | 0.2 | 0.2 | | |
| Ammonium phthalate | | | | | | | | | | | | 0.2 | |
| Potassium sulfate | | | | | | | | | | | | | 0.2 |
| Acetylenol E100 | 0.2 | 0.2 | 0.2 | 0.2 | 0.2 | 0.2 | 0.2 | 0.2 | 0.2 | 0.8 | 0.8 | 0.2 | 0.2 |
| Ion-exchanged water | 44.8 | 44.8 | 44.8 | 44.8 | 44.8 | 49.6 | 49.6 | 49.6 | 49.6 | 49.0 | 49.0 | 49.6 | 49.6 |
| Free copper ion content (ppm) | ND | ND | ND | ND | ND | ND | ND | ND | ND | 23 | 23 | ND | ND |

| | Example | | | | | | | | | | | | |
|---|---|---|---|---|---|---|---|---|---|---|---|---|---|
| | I-53 | I-54 | I-55 | I-56 | I-57 | I-58 | I-59 | I-60 | I-61 | I-62 | I-63 | I-64 | I-65 |
| No. of pigment dispersion | 1 | 6 | 1 | 1 | 1 | 6 | 3 | 7 | 1 | 1 | 1 | 1 | 1 |
| No. of resin in resin aqueous solution | — | — | A1 | A2 | A3 | A3 | A3 | A3 | A4 | A5 | A6 | A7 | U1 |
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Amount of resin aqueous solution | | | 10.0 | 10.0 | 10.0 | 10.0 | 10.0 | 10.0 | 10.0 | 10.0 | 10.0 | 10.0 | 5.0 |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | | |
| Triethylene glycol | | | | | | | | | | | | | |
| Polyethylene glycol 200 | 5.0 | 5.0 | | | | | | | | | | | |
| Polyethylene glycol 1000 | | | | | | | | | | | | | |
| Polyethylene glycol 1500 | | | | | | | | | | | | | |
| Triethylene glycol monopentyl ether | | | | | | | | | | | | | |
| Triethylene glycol monobutyl ether | | | | | | | | | | | | | |
| 1,3-propanediol | | | | | | | | | | | | | |
| 1,4-butanediol | | | | | | | | | | | | | |
| 1,6-hexanediol | | | | | | | | | | | | | |
| 1,8-octanediol | | | | | | | | | | | | | |

TABLE 4-continued

Composition and characteristics of ink in first embodiment

| | | | | | | | | | | | | | |
|---|---|---|---|---|---|---|---|---|---|---|---|---|---|
| Potassium benzoate | | | | | | | | | | | | | |
| Sodium phthalate | | | | | | | | | | | | | |
| Potassium phthalate | 0.2 | 0.2 | | | | | | | | | | | |
| Ammonium phthalate | | | | | | | | | | | | | |
| Potassium sulfate | | | | | | | | | | | | | |
| Acetylenol E100 | 0.2 | 0.2 | 0.2 | 0.2 | 0.2 | 0.2 | 0.8 | 0.8 | 0.2 | 0.2 | 0.2 | 0.2 | 0.2 |
| Ion-exchanged water | 44.6 | 44.6 | 39.8 | 39.8 | 39.8 | 39.8 | 39.2 | 39.2 | 39.8 | 39.8 | 39.8 | 39.8 | 44.8 |
| Free copper ion content (ppm) | ND | ND | ND | ND | ND | ND | 23 | 23 | ND | ND | ND | ND | ND |

| | Example | | | | | | | | | | | | |
|---|---|---|---|---|---|---|---|---|---|---|---|---|---|
| | I-66 | I-67 | I-68 | I-69 | I-70 | I-71 | I-72 | I-73 | I-74 | I-75 | I-76 | I-77 | I-78 |
| No. of pigment dispersion | 1 | 1 | 6 | 3 | 7 | 1 | 1 | 1 | 1 | 1 | 1 | 6 | 6 |
| No. of resin in resin aqueous solution | U2 | U3 | U3 | U3 | U3 | U4 | U5 | U6 | U7 | A3 | U3 | A3 | U3 |
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Amount of resin aqueous solution | 5.0 | 5.0 | 5.0 | 5.0 | 5.0 | 5.0 | 5.0 | 5.0 | 5.0 | 10.0 | 5.0 | 10.0 | 5.0 |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | | |
| Triethylene glycol | | | | | | | | | | | | | |
| Polyethylene glycol 200 | | | | | | | | | | 5.0 | 5.0 | 5.0 | 5.0 |
| Polyethylene glycol 1000 | | | | | | | | | | | | | |
| Polyethylene glycol 1500 | | | | | | | | | | | | | |
| Triethylene glycol monopentyl ether | | | | | | | | | | | | | |
| Triethylene glycol monobutyl ether | | | | | | | | | | | | | |
| 1,3-propanediol | | | | | | | | | | | | | |
| 1,4-butanediol | | | | | | | | | | | | | |
| 1,6-hexanediol | | | | | | | | | | | | | |
| 1,8-octanediol | | | | | | | | | | | | | |
| Potassium benzoate | | | | | | | | | | | | | |
| Sodium phthalate | | | | | | | | | | | | | |
| Potassium phthalate | | | | | | | | | | | | | |
| Ammonium phthalate | | | | | | | | | | | | | |
| Potassium sulfate | | | | | | | | | | | | | |
| Acetylenol E100 | 0.2 | 0.2 | 0.2 | 0.8 | 0.8 | 0.2 | 0.2 | 0.2 | 0.2 | 0.2 | 0.2 | 0.2 | 0.2 |
| Ion-exchanged water | 44.8 | 44.8 | 44.8 | 44.2 | 44.2 | 44.8 | 44.8 | 44.8 | 44.8 | 34.8 | 39.8 | 34.8 | 39.8 |
| Free copper ion content (ppm) | ND | ND | ND | 23 | 23 | ND | ND | ND | ND | ND | ND | ND | ND |

| | Example | | | | | | | | | |
|---|---|---|---|---|---|---|---|---|---|---|
| | I-79 | I-80 | I-81 | I-82 | I-83 | I-84 | I-85 | I-86 | I-87 | I-88 |
| No. of pigment dispersion | 3 | 7 | 1 | 1 | 6 | 6 | 3 | 3 | 7 | 7 |
| No. of resin in resin aqueous solution | A3 | A3 | A3 | U3 | A3 | U3 | A3 | U3 | A3 | U3 |
| Amount of pigment dispersion | 30.0 | 30.0 | 30.0 | 30.0 | 30.0 | 30.0 | 30.0 | 30.0 | 30.0 | 30.0 |
| Amount of resin aqueous solution | 10.0 | 10.0 | 10.0 | 5.0 | 10.0 | 5.0 | 10.0 | 5.0 | 10.0 | 5.0 |
| Glycerin | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 |
| Diethylene glycol | | | | | | | | | | |
| Triethylene glycol | | | | | | | | | | |
| Polyethylene glycol 200 | 5.0 | 5.0 | 5.0 | 5.0 | 5.0 | 5.0 | 5.0 | 5.0 | 5.0 | 5.0 |
| Polyethylene glycol 1000 | | | | | | | | | | |
| Polyethylene glycol 1500 | | | | | | | | | | |
| Triethylene glycol monopentyl ether | | | | | | | | | | |
| Triethylene glycol monobutyl ether | | | | | | | | | | |
| 1,3-propanediol | | | | | | | | | | |
| 1,4-butanediol | | | | | | | | | | |
| 1,6-hexanediol | | | | | | | | | | |
| 1,8-octanediol | | | | | | | | | | |
| Potassium benzoate | | | | | | | | | | |
| Sodium phthalate | | | | | | | | | | |
| Potassium phthalate | | | 0.2 | 0.2 | 0.2 | 0.2 | 0.2 | 0.2 | 0.2 | 0.2 |
| Ammonium phthalate | | | | | | | | | | |
| Potassium sulfate | | | | | | | | | | |
| Acetylenol E100 | 0.8 | 0.8 | 0.2 | 0.2 | 0.2 | 0.2 | 0.8 | 0.8 | 0.8 | 0.8 |
| Ion-exchanged water | 34.2 | 34.2 | 34.6 | 39.6 | 34.6 | 39.6 | 34.0 | 39.0 | 34.0 | 39.0 |
| Free copper ion content (ppm) | 23 | 23 | ND | ND | ND | ND | 23 | 23 | 23 | 23 |

| | Comparative Example | | | | | | | | | | | |
|---|---|---|---|---|---|---|---|---|---|---|---|---|
| | I-1 | I-2 | I-3 | I-4 | I-5 | I-6 | I-7 | I-8 | I-9 | I-10 | I-11 | I-12 |
| No. of pigment dispersion | 31 | 32 | 33 | 34 | 35 | 36 | 37 | 38 | 39 | 40 | 41 | 42 |
| No. of resin in resin aqueous solution | — | — | — | — | — | — | — | — | — | — | — | — |

TABLE 4-continued

Composition and characteristics of ink in first embodiment

| | | | | | | | | | | | | |
|---|---|---|---|---|---|---|---|---|---|---|---|---|
| Amount of pigment dispersion | 30.0 | 30.0 | 30.0 | 30.0 | 30.0 | 30.0 | 30.0 | 30.0 | 30.0 | 30.0 | 30.0 | 30.0 |
| Amount of resin aqueous solution | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 |
| Diethylene glycol | | | | | | | | | | | | |
| Triethylene glycol | | | | | | | | | | | | |
| Polyethylene glycol 200 | | | | | | | | | | | | |
| Polyethylene glycol 1000 | | | | | | | | | | | | |
| Polyethylene glycol 1500 | | | | | | | | | | | | |
| Triethylene glycol monopentyl ether | | | | | | | | | | | | |
| Triethylene glycol monobutyl ether | | | | | | | | | | | | |
| 1,3-propanediol | | | | | | | | | | | | |
| 1,4-butanediol | | | | | | | | | | | | |
| 1,6-hexanediol | | | | | | | | | | | | |
| 1,8-octanediol | | | | | | | | | | | | |
| Potassium benzoate | | | | | | | | | | | | |
| Sodium phthalate | | | | | | | | | | | | |
| Potassium phthalate | | | | | | | | | | | | |
| Ammonium phthalate | | | | | | | | | | | | |
| Potassium sulfate | | | | | | | | | | | | |
| Acetylenol E100 | 0.2 | 0.2 | 0.2 | 0.2 | 0.2 | 0.8 | 0.2 | 0.8 | 0.2 | 0.2 | 0.2 | 0.2 |
| Ion-exchanged water | 49.8 | 49.8 | 49.8 | 49.8 | 49.8 | 49.2 | 49.8 | 49.2 | 49.8 | 49.8 | 49.8 | 49.8 |
| Free copper ion content (ppm) | ND | 23 | ND | 23 | ND | ND | 23 | 23 | ND | ND | 23 | 23 |

| | Comparative Example | | | | | | | | | | |
|---|---|---|---|---|---|---|---|---|---|---|---|
| | I-13 | I-14 | I-15 | I-16 | I-17 | I-18 | I-19 | I-20 | I-21 | I-22 | I-23 |
| No. of pigment dispersion | 43 | 44 | 45 | 46 | 47 | 48 | 49 | 50 | 51 | 52 | 31/35 |
| No. of resin in resin aqueous solution | — | — | — | — | — | — | — | — | — | — | — |
| Amount of pigment dispersion | 30.0 | 30.0 | 30.0 | 30.0 | 30.0 | 30.0 | 30.0 | 30.0 | 30.0 | 30.0 | 30.0 |
| Amount of resin aqueous solution | | | | | | | | | | | |
| Glycerin | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 |
| Diethylene glycol | | | | | | | | | | | |
| Triethylene glycol | | | | | | | | | | | |
| Polyethylene glycol 200 | | | | | | | | | | | |
| Polyethylene glycol 1000 | | | | | | | | | | | |
| Polyethylene glycol 1500 | | | | | | | | | | | |
| Triethylene glycol monopentyl ether | | | | | | | | | | | |
| Triethylene glycol monobutyl ether | | | | | | | | | | | |
| 1,3-propanediol | | | | | | | | | | | |
| 1,4-butanediol | | | | | | | | | | | |
| 1,6-hexanediol | | | | | | | | | | | |
| 1,8-octanediol | | | | | | | | | | | |
| Potassium benzoate | | | | | | | | | | | |
| Sodium phthalate | | | | | | | | | | | |
| Potassium phthalate | | | | | | | | | | | |
| Ammonium phthalate | | | | | | | | | | | |
| Potassium sulfate | | | | | | | | | | | |
| Acetylenol E100 | 0.2 | 0.2 | 0.2 | 0.2 | 0.2 | 0.2 | 0.2 | 0.2 | 0.2 | 0.2 | 0.2 |
| Ion-exchanged water | 49.8 | 49.8 | 49.8 | 49.8 | 49.8 | 49.8 | 49.8 | 49.8 | 49.8 | 49.8 | 49.8 |
| Free copper ion content (ppm) | ND | ND | ND | ND | 23 | 23 | 23 | 23 | ND | ND | ND |

TABLE 5

Composition and characteristics of ink in second embodiment

| | Example | | | | | | | | | |
|---|---|---|---|---|---|---|---|---|---|---|
| | II-1 | II-2 | II-3 | II-4 | II-5 | II-6 | II-7 | II-8 | II-9 | II-10 |
| No. of pigment dispersion | 6 | 53 | 7 | 54 | 55 | 7 | 7 | 7 | 56 | 20 |
| No. of resin in resin aqueous solution | — | — | — | — | — | A3 | — | — | — | — |
| Amount of pigment dispersion | 30.0 | 30.0 | 30.0 | 30.0 | 30.0 | 30.0 | 30.0 | 30.0 | 30.0 | 30.0 |
| Glycerin | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 |
| Polyethylene glycol 200 | | | | | | 5.0 | | | | |
| Potassium benzoate | | | | | | 0.2 | | | | |
| Amount of resin aqueous solution | | | | | | 10.0 | | | | |

TABLE 5-continued

Composition and characteristics of ink in second embodiment

| Acetylenol E100 | 0.2 | 0.2 | 0.2 | 0.2 | 0.2 | 0.8 | 0.2 | 0.2 | 0.2 | 0.2 |
|---|---|---|---|---|---|---|---|---|---|---|
| Ion-exchanged water | 49.8 | 49.8 | 49.8 | 49.8 | 49.8 | 34.0 | 49.8 | 49.8 | 49.8 | 49.8 |
| Free copper ion content (ppm) | 25 | 25 | 25 | 25 | 25 | 25 | 50 | 55 | 25 | 25 |

| | Example | | | | | | | Comparative Example | |
|---|---|---|---|---|---|---|---|---|---|
| | II-11 | II-12 | II-13 | II-14 | II-15 | II-16 | II-17 | II-1 | II-2 |
| No. of pigment dispersion | 1 | 2 | 3 | 57 | 58 | 23 | 59 | 38 | 42 |
| No. of resin in resin aqueous solution | — | — | — | — | — | — | — | — | — |
| Amount of pigment dispersion | 30.0 | 30.0 | 30.0 | 30.0 | 30.0 | 30.0 | 30.0 | 30.0 | 30.0 |
| Glycerin | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 |
| Polyethylene glycol 200 | | | | | | | | | |
| Potassium benzoate | | | | | | | | | |
| Amount of resin aqueous solution | | | | | | | | | |
| Acetylenol E100 | 0.2 | 0.8 | 0.8 | 0.8 | 0.8 | 0.2 | 0.8 | 0.8 | 0.2 |
| Ion-exchanged water | 49.8 | 49.2 | 49.2 | 49.2 | 49.2 | 49.8 | 49.2 | 49.2 | 49.8 |
| Free copper ion content (ppm) | 25 | 25 | 25 | 25 | 25 | 25 | 25 | 25 | 25 |

TABLE 6

Composition and characteristics of ink in third embodiment

| | Example | | | | | | | | | | | | |
|---|---|---|---|---|---|---|---|---|---|---|---|---|---|
| | III-1 | III-2 | III-3 | III-4 | III-5 | III-6 | III-7 | III-8 | III-9 | III-10 | III-11 | III-12 | III-13 |
| No. of pigment dispersion | 60 | 61 | 62 | 63 | 64 | 65 | 66 | 67 | 66 | 68 | 69 | 66 | 70 |
| No. of resin in resin aqueous solution | — | — | — | — | — | — | — | — | A3 | — | — | — | — |
| Amount of pigment dispersion | 30.0 | 30.0 | 30.0 | 30.0 | 30.0 | 30.0 | 30.0 | 30.0 | 30.0 | 30.0 | 30.0 | 30.0 | 30.0 |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 | 10.0 |
| Polyethylene glycol 200 | 5.0 | | | | | | | | 5.0 | | | | |
| Potassium benzoate | | | | | | | | | 0.2 | | | | |
| Amount of resin aqueous solution | | | | | | | | | 10.0 | | | | |
| Acetylenol E100 | 0.2 | 0.2 | 0.2 | 0.2 | 0.8 | 0.8 | 0.2 | 0.2 | 0.2 | 0.2 | 0.2 | 0.8 | 0.8 |
| Ion-exchanged water | 44.8 | 49.8 | 49.8 | 49.8 | 49.2 | 49.2 | 49.8 | 49.8 | 34.6 | 49.8 | 49.8 | 49.2 | 49.2 |
| Free copper ion content (ppm) | 25 | 25 | 25 | 25 | 25 | 25 | 25 | 25 | 25 | 25 | 25 | 50 | 50 |
| Total amount of phosphonic acid group (μmol) | 15.0 | 6.8 | 6.8 | 9.8 | 15.0 | 6.8 | 6.8 | 9.8 | 6.8 | 5.9 | 5.4 | 6.8 | 7.6 |
| Total amount of phosphonic acid group/free copper ion (time) | 38.1 | 17.2 | 17.2 | 24.8 | 38.1 | 17.2 | 17.2 | 24.8 | 17.2 | 15.1 | 13.7 | 8.6 | 9.6 |

| | Example | | | | | | | | | | | |
|---|---|---|---|---|---|---|---|---|---|---|---|---|
| | III-14 | III-15 | III-16 | III-17 | III-18 | III-19 | III-20 | III-21 | III-22 | III-23 | III-24 | III-25 |
| No. of pigment dispersion | 71 | 71 | 72 | 1 | 2 | 3 | 57 | 6 | 53 | 7 | 54 | 73 |
| No. of resin in resin aqueous solution | — | — | — | — | — | — | — | — | — | — | — | — |
| Amount of pigment dispersion | 30.0 | 30.0 | 30.0 | 30.0 | 30.0 | 30.0 | 30.0 | 30.0 | 30.0 | 30.0 | 30.0 | 30.0 |
| Glycerin | 10.0 | 10.0 | 10.0 | 10.0 | 10.0 | 10.0 | 10.0 | 10.0 | 10.0 | 10.0 | 10.0 | 10.0 |
| Ethylene glycol | 10.0 | 10.0 | 10.0 | 10.0 | 10.0 | 10.0 | 10.0 | 10.0 | 10.0 | 10.0 | 10.0 | 10.0 |
| Polyethylene glycol 200 | | | | | | | | | | | | |
| Potassium benzoate | | | | | | | | | | | | |
| Amount of resin aqueous solution | | | | | | | | | | | | |
| Acetylenol E100 | 0.2 | 0.2 | 0.2 | 0.2 | 0.8 | 0.8 | 0.8 | 0.8 | 0.2 | 0.8 | 0.2 | 0.2 |
| Ion-exchanged water | 49.8 | 49.8 | 49.8 | 49.8 | 49.2 | 49.2 | 49.2 | 49.2 | 49.8 | 49.2 | 49.8 | 49.8 |
| Free copper ion content (ppm) | 50 | 55 | 55 | 25 | 25 | 25 | 25 | 25 | 25 | 25 | 25 | 25 |
| Total amount of phosphonic acid group (μmol) | 8.1 | 8.1 | 8.9 | 6.0 | 2.7 | 2.7 | 3.9 | 6.0 | 2.7 | 2.7 | 3.9 | 5.1 |
| Total amount of phosphonic acid group/free copper ion (time) | 10.3 | 9.4 | 10.3 | 15.3 | 6.9 | 6.9 | 9.9 | 15.3 | 6.9 | 6.9 | 9.9 | 13.0 |

Evaluation

The inks obtained as described above were used and evaluation of each of the following items was performed. In the present invention, in the evaluation criteria of each of the following items, AA, A and B were favorable levels and C was an unacceptable level. The evaluation results are shown in Tables 7 to 9.

Evaluation of Color Developability

A modified ink jet recording apparatus (trade name "PIXUS iP3100", produced by CANON KABUSHIKI KAISHA) equipped with a recording head which ejects a liquid by the action of thermal energy was used for recording images. Each of the inks obtained as described above was filled into an ink cartridge, and the ink cartridge was set at the position of the black ink. The recording condition was specified to be 1-pass one-way recording in which an image with a width corresponding to an arrangement width of ejection orifice of a recording head was recorded by only scanning started from the home position of the recording head. In the present example, 1/600 inch by 1/600 inch was defined as 1 pixel, and in the case of a solid image with a recording duty of 100%, the amount of application of ink to a recording medium was specified to be 25 ng per pixel.

Three types of recording medium, PB Paper GF-500 (produced by CANON KABUSHIKI KAISHA), BUSINESS MULTIPURPOSE 4200 PAPER (produced by Xerox Corporation), and Bright White Inkjet Paper (produced by Hewlett-Packard), were used. A solid image 1 inch by 1 inch with a recording duty of 100% was recorded on each of the above-described recording medium. After one day was elapsed, the optical density of the solid image was measured by using a spectrophotometer (trade name "Spectrolino", produced by Gretag Macbeth) under the condition of light source: D50 and visual field: 2 degrees, and the color developability was evaluated on the basis of the average value of three types of recording medium. The evaluation criteria of the color developability were as described below.

In the case of black ink,
AA: average value was 1.5 or more,
A: average value was 1.4 or more and less than 1.5,
B: average value was 1.2 or more and less than 1.4, and
C: average value was less than 1.2.
In the case of color ink,
AA: average value was 1.2 or more,
A: average value was 1.1 or more and less than 1.2,
B: average value was 1.0 or more and less than 1.1, and
C: average value was less than 1.0.

Intermittent Ejection Stability

An ink cartridge was set into the same ink jet recording apparatus as that used in the above-described evaluation of the color developability of an image under an environment at a temperature of 30 degrees Celsius and a relative humidity of 15%. A cap covering the ejection orifice of the recording head was taken off, and after 30 seconds was elapsed in that state, characters of 5 points and 8 points were recorded. The characters at the initial stage of writing were visually examined, so as to evaluate the intermittent ejection stability. The evaluation criteria of the intermittent ejection stability were as described below.

AA: faint blurring of character was not observed
A: faint blurring of character was observed slightly, but characters of 5 points were readable
B: faint blurring of character was observed slightly, and characters of 5 points were not readable, but characters of 8 points were readable
C: characters were not read easily because of a great extent of faint blurring Storage Stability Each of the inks obtained as described above was put into a polytetrafluoroethylene container and was sealed. This was put into an oven at a temperature of 60 degrees Celsius, and was stood for 2 months. After the ink was returned to ambient temperature, the viscosity of the ink and the particle diameter of the pigment were measured. The viscosity of the ink was measured by using an E type viscometer (trade name "RE-80L", produced by TOKI) at a temperature of 25 degrees Celsius and at 50 rpm. The particle diameter of the pigment was measured with a concentrated system particle analyzer (trade name "FPAR-1000", produced by OTSUKA ELECTRONICS CO., LTD.).

A: the rates of increase in the viscosity of ink and the particle diameter of the pigment after storage were less than 3% as compared with those before storage B: the rates of increase in the viscosity of ink and the particle diameter of the pigment after storage were 3% or more and less than 5% as compared with those before storage C: the rates of increase in the viscosity of ink and the particle diameter of the pigment after storage were 5% or more as compared with those before storage Long-Term Ejection Stability An ink cartridge was set into the same ink jet recording apparatus as that used in the above-described evaluation of the color developability of an image. Then, 3,000 sheets of solid image with a recording duty of 50% were recorded all over A4-size PB Paper GF-500 (produced by CANON KABUSHIKI KAISHA). Thereafter, characters of 5 points and 8 points were recorded. The characters were visually examined, so as to evaluate the long-term ejection stability. The evaluation criteria of the long-term ejection stability were as described below.

AA: all dots constituting the characters were recorded normally
A: part of dots constituting the characters were not formed normally in some places, although characters of 5 points were readable
B: part of dots constituting the characters were not formed normally in some places, characters of 5 points were not readable, but characters of 8 points were readable
C: dots constituting the characters were not formed normally in many places, and all characters were not read easily Wettability An urethane rubber wiper in the state of being immersed in each ink was placed in a constant temperature bath at a temperature of 60 degrees Celsius for 1 month. Thereafter, the wiper was washed with ion-exchanged water, and was attached to a predetermined place of the same ink jet recording apparatus as that used in the above-described evaluation of the color developability of an image. This recording apparatus was used, and 5 sheets of solid image with a recording duty of 50% were recorded all over A4-size PB Paper GF-500 (produced by CANON KABUSHIKI KAISHA). After a cleaning operation was performed, characters of 5 points and 8 points were recorded. The characters and the ejection orifice surface of the recording head were visually examined, so as to evaluate the wettability. The evaluation criteria of the wettability were as described below.

A: characters of 5 points were readable and the ejection orifice surface was wiped normally
B: characters of 5 points were not readable, characters of 8 points were readable, and some places of the ejection orifice surface were not wiped normally, so as to left the ink
C: all characters were not read easily and the ejection orifice surface was not wiped normally, so as to left the ink

TABLE 7

Evaluation result of first embodiment

|  |  | Color developability | Intermittent ejection stability | Storage stability |
|---|---|---|---|---|
| Example | I-1 | A | A | A |
|  | I-2 | A | A | A |
|  | I-3 | A | A | A |
|  | I-4 | A | A | A |
|  | I-5 | A | A | A |
|  | I-6 | A | A | A |
|  | I-7 | A | A | A |
|  | I-8 | A | A | A |
|  | I-9 | A | A | A |
|  | I-10 | A | A | A |

TABLE 7-continued

Evaluation result of first embodiment

| | Color developability | Intermittent ejection stability | Storage stability |
|---|---|---|---|
| I-11 | A | A | A |
| I-12 | A | A | A |
| I-13 | A | A | A |
| I-14 | A | A | A |
| I-15 | A | A | A |
| I-16 | A | A | A |
| I-17 | A | A | A |
| I-18 | A | A | A |
| I-19 | A | A | A |
| I-20 | A | A | A |
| I-21 | A | A | A |
| I-22 | A | A | A |
| I-23 | A | A | A |
| I-24 | A | A | A |
| I-25 | A | A | A |
| I-26 | A | A | A |
| I-27 | A | A | B |
| I-28 | A | A | A |
| I-29 | A | A | A |
| I-30 | A | B | A |
| I-31 | A | A | A |
| I-32 | A | AA | A |
| I-33 | A | AA | A |
| I-34 | A | AA | A |
| I-35 | A | AA | A |
| I-36 | A | AA | A |
| I-37 | A | AA | A |
| I-38 | A | A | A |
| I-39 | A | A | A |
| I-40 | A | AA | A |
| I-41 | A | A | A |
| I-42 | A | AA | A |
| I-43 | A | AA | A |
| I-44 | A | A | A |
| I-45 | AA | A | A |
| I-46 | AA | A | A |
| I-47 | AA | A | A |
| I-48 | AA | A | A |
| I-49 | AA | A | A |
| I-50 | AA | A | A |
| I-51 | AA | A | A |
| I-52 | AA | A | A |
| I-53 | AA | AA | A |
| I-54 | AA | AA | A |
| I-55 | A | A | A |
| I-56 | AA | A | A |
| I-57 | AA | A | A |
| I-58 | AA | A | A |
| I-59 | AA | A | A |
| I-60 | AA | A | A |
| I-61 | AA | A | A |
| I-62 | AA | A | A |
| I-63 | AA | A | A |
| I-64 | A | A | A |
| I-65 | A | A | A |
| I-66 | AA | A | A |
| I-67 | AA | A | A |
| I-68 | AA | A | A |
| I-69 | AA | A | A |
| I-70 | AA | A | A |
| I-71 | AA | A | A |
| I-72 | AA | A | A |
| I-73 | AA | A | A |
| I-74 | A | A | A |
| I-75 | AA | AA | A |
| I-76 | AA | AA | A |
| I-77 | AA | AA | A |
| I-78 | AA | AA | A |
| I-79 | AA | AA | A |
| I-80 | AA | AA | A |
| I-81 | AA | AA | A |
| I-82 | AA | AA | A |
| I-83 | AA | AA | A |
| I-84 | AA | AA | A |
| I-85 | AA | AA | A |
| I-86 | AA | AA | A |
| I-87 | AA | AA | A |
| I-88 | AA | AA | A |
| Comparative example I-1 | A | C | A |
| I-2 | A | C | A |
| I-3 | C | A | A |
| I-4 | C | A | A |
| I-5 | C | A | A |
| I-6 | C | A | A |
| I-7 | C | A | A |
| I-8 | C | A | A |
| I-9 | A | C | A |
| I-10 | A | C | A |
| I-11 | A | C | A |
| I-12 | A | C | A |
| I-13 | A | C | A |
| I-14 | A | C | A |
| I-15 | C | A | A |
| I-16 | C | A | A |
| I-17 | A | C | A |
| I-18 | A | C | A |
| I-19 | C | A | A |
| I-20 | C | A | A |
| I-21 | C | A | A |
| I-22 | C | A | A |
| I-23 | C | C | A |

TABLE 8

Evaluation result of second embodiment

| | Color developability | Intermittent ejection stability | Storage stability | Long-term ejection stability |
|---|---|---|---|---|
| Example II-1 | A | A | A | A |
| II-2 | A | A | A | A |
| II-3 | A | A | A | A |
| II-4 | A | A | A | A |
| II-5 | A | A | A | A |
| II-6 | AA | AA | A | A |
| II-7 | A | A | A | A |
| II-8 | A | A | A | B |
| II-9 | A | A | A | A |
| II-10 | A | A | A | A |
| II-11 | A | A | A | C |
| II-12 | A | A | A | C |
| II-13 | A | A | A | C |
| II-14 | A | A | A | C |
| II-15 | A | A | A | C |
| II-16 | A | A | A | C |
| II-17 | A | A | A | C |
| Comparative example II-1 | C | A | A | A |
| II-2 | A | C | A | C |

TABLE 9

Evaluation result of third embodiment

| | Color developability | Intermittent ejection stability | Storage stability | Wettability |
|---|---|---|---|---|
| Example III-1 | A | AA | A | A |
| III-2 | A | A | A | A |
| III-3 | A | A | A | A |
| III-4 | A | A | A | A |
| III-5 | A | A | A | A |

TABLE 9-continued

Evaluation result of third embodiment

| | Color developability | Intermittent ejection stability | Storage stability | Wettability |
|---|---|---|---|---|
| III-6 | A | A | A | A |
| III-7 | A | A | A | A |
| III-8 | A | A | A | A |
| III-9 | AA | AA | A | A |
| III-10 | A | A | A | A |
| III-11 | A | A | A | A |
| III-12 | A | A | A | B |
| III-13 | A | A | A | B |
| III-14 | A | A | A | A |
| III-15 | A | A | A | B |
| III-16 | A | A | A | B |
| III-17 | A | A | A | C |
| III-18 | A | A | A | C |
| III-19 | A | A | A | C |
| III-20 | A | A | A | C |
| III-21 | A | A | A | C |
| III-22 | A | A | A | C |
| III-23 | A | A | A | C |
| III-24 | A | A | A | C |
| III-25 | A | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107453, filed May 9, 2012 and No. 2013-090481, filed Apr. 23, 2013, which are hereby incorporated by reference herein in their entirety.

The invention claimed is:

1. An aqueous ink for ink jet, comprising a self-dispersible pigment in which a first functional group including a phosphonic acid group and a second functional group including at least one of a carboxylic acid group and a sulfonic acid group are bonded to a particle surface,
wherein a surface charge amount derived from the phosphonic acid group included in the first functional group is 0.3 micromoles/m$^2$ or more,
a total surface charge amount derived from the carboxylic acid group and the sulfonic acid group included in the second functional group is 1.0 micromoles/m$^2$ or more, and
a total surface charge amount derived from anionic groups included in the first functional group and the second functional group is 2.0 micromoles/m$^2$ or more and 8.0 micromoles/m$^2$ or less.

2. The aqueous ink according to claim 1, wherein the specific surface area of the self-dispersible pigment is 50 m$^2$/g or more and 250 m$^2$/g or less.

3. The aqueous ink according to claim 1, further comprising at least one of the compound represented by Formula (1) described below and the compound represented by Formula (2) described below,

Formula (1)

(where n represents an integer of 3 or more and 30 or less, R represents an hydrogen atom or $C_mH_{2m+1}$, and m represents an integer of 1 or more and 4 or less)

Formula (2)

(where k represents an integer of 4 or more and 6 or less).

4. The aqueous ink according to claim 1, further comprising a salt constituted by combination of at least one type of cation selected from the group consisting of an alkali metal ion, an ammonium ion and an organic ammonium ion and at least one type of anion selected from the group consisting of Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCO$_3^-$, HCOO$^-$, (COO$^-$)$_2$, COOH(COO$^-$), CH$_3$COO$^-$, C$_2$H$_4$(COO)$_2$, C$_6$H$_5$COO$^-$, C$_6$H$_4$(COO)$_2$ PO$_4^{3-}$, HPO$_4^{2-}$ and H$_2$PO$_4^-$.

5. The aqueous ink according to claim 1, further comprising at least one of an acrylic resin having an acid value of 100 mgKOH/g or more and 160 mgKOH/g or less and an urethane resin having an acid value of 40 mgKOH/g or more and 120 mgKOH/g or less.

6. The aqueous ink according to claim 4, wherein the cation constituting the salt is an alkali metal ion.

7. The aqueous ink according to claim 1, wherein the first functional group includes two phosphonic acid groups.

8. The aqueous ink according to claim 7, wherein the first functional group includes a structure of —CQ(PO$_3$[M$_1$]$_2$)$_2$, where Q represents any one of a hydrogen atom, R, OR, SR and NR$_2$, R represents independently any one of a hydrogen atom, an alkyl group, an acyl group, an aralkyl group and an aryl group, and M$_1$ represents independently at least one type selected from the group consisting of a hydrogen atom, an alkali metal, ammonium and organic ammonium.

9. The aqueous ink according to claim 7, wherein the first functional group includes a structure of —CH(PO$_3$[M$_1$]$_2$)$_2$, where M$_1$ represents independently at least one type selected from the group consisting of a hydrogen atom, an alkali metal, ammonium and organic ammonium.

10. The aqueous ink according to claim 1, further comprising a free copper ion,
wherein the second functional group includes a sulfonic acid group,
a surface charge amount derived from the sulfonic acid group included in the second functional group is 1.0 micromoles/m$^2$ or more, and
the aqueous ink is applied to a method in which the ink is ejected from a recording head by the action of thermal energy.

11. The aqueous ink according to claim 10, wherein the surface charge amount derived from the sulfonic acid group included in the second functional group is 7.7 micromoles/m$^2$ or less.

12. The aqueous ink according to claim 1, further comprising a free copper ion,
wherein a surface charge amount derived from the phosphonic acid group included in the first functional group is 2.0 micromoles/m$^2$ or more, and a synthetic rubber is included in a material constituting a member to be brought
into contact with the aqueous ink.

13. The aqueous ink according to claim 12 wherein the synthetic rubber is an urethane rubber.

14. The aqueous ink according to claim 12, wherein the member is a wiper to wipe a surface provided with an ejection orifice of a recording head.

15. The aqueous ink according to claim 12, wherein the pigment species of the self-dispersible pigment is a pigment having a copper phthalocyanine skeleton.

16. The aqueous ink according to claim 15, wherein the pigment having a copper phthalocyanine skeleton is at least one of C. I. Pigment Blue 15:3 and C.I. Pigment Blue 15:4.

17. The aqueous ink according to claim 12, wherein the total amount of phosphonic acid groups included in the first functional group is 10.0 times the amount of the free copper ion in the ink on a molar ratio basis.

18. The aqueous ink according to claim 12, wherein the surface charge amount derived from the phosphonic acid group included in the first functional group is 3.0 micromoles/m² or less.

19. The aqueous ink according to claim 1, wherein in the second functional group, at least one of the carboxylic acid group and the sulfonic acid group is bonded to the surface of the pigment particle through other atomic group (—R—), where —R— represents a straight chain or a branched alkylene group having a carbon number of 1 to 12 or an arylene group.

20. The aqueous ink according to claim 1, wherein in the second functional group, at least one of the carboxylic acid group and the sulfonic acid group is bonded to the surface of the pigment particle through a phenylene group.

21. The aqueous ink according to claim 1, wherein in the second functional group includes a structure of —$C_6H_5$—$SO_3M_1$, where $M_1$ represents independently at least one type selected from the group consisting of a hydrogen atom, an alkali metal, ammonium and organic ammonium.

22. The aqueous ink according to claim 1, wherein the surface charge amount derived from the phosphonic acid group included in the first functional group is 3.0 micromoles/m² or less.

23. The aqueous ink according to claim 1, wherein the total surface charge amount derived from the carboxylic acid group and the sulfonic acid group included in the second functional group is 7.7 micromoles/m² or less.

24. An ink cartridge comprising an ink and an ink storage portion storing the ink,
wherein the ink comprises the aqueous ink according to claim 1.

25. An ink jet recording method comprising the step of recording an image on a recording medium by ejecting an ink from a recording head of an ink jet method, wherein the ink is the aqueous ink according to claim 1.

\* \* \* \* \*